US009355606B2

(12) United States Patent
Saitoh et al.

(10) Patent No.: US 9,355,606 B2
(45) Date of Patent: May 31, 2016

(54) LIQUID CRYSTAL DISPLAY DEVICE AND LIQUID CRYSTAL DISPLAY DEVICE DRIVING METHOD

(71) Applicant: Sharp Kabushiki Kaisha, Osaka-shi, Osaka (JP)

(72) Inventors: Kohji Saitoh, Osaka (JP); Akihisa Iwamoto, Osaka (JP); Masami Ozaki, Osaka (JP); Masaki Uehata, Osaka (JP); Jun Nakata, Osaka (JP); Tomohiko Nishimura, Osaka (JP)

(73) Assignee: Sharp Kabushiki Kaisha, Osaka (JP)

( * ) Notice: Subject to any disclaimer, the term of this patent is extended or adjusted under 35 U.S.C. 154(b) by 44 days.

(21) Appl. No.: 14/375,163

(22) PCT Filed: Jan. 25, 2013

(86) PCT No.: PCT/JP2013/051620
§ 371 (c)(1),
(2) Date: Jul. 29, 2014

(87) PCT Pub. No.: WO2013/115100
PCT Pub. Date: Aug. 8, 2013

(65) Prior Publication Data
US 2015/0009195 A1 Jan. 8, 2015

(30) Foreign Application Priority Data

Jan. 31, 2012 (JP) .................................. 2012-019153

(51) Int. Cl.
*G06F 3/038* (2013.01)
*G09G 5/00* (2006.01)
(Continued)

(52) U.S. Cl.
CPC ............ *G09G 3/3655* (2013.01); *G02F 1/1343* (2013.01); *G02F 1/1368* (2013.01);
(Continued)

(58) Field of Classification Search
CPC .............. G09G 3/3648; G09G 3/3688; G09G 2310/0245; G09G 2310/067; G09G 2320/046; G09G 2330/027; G09G 3/3685; G09G 3/3674; G09G 2300/0478; G09G 3/3655; G02F 2001/133397; G02F 1/1368; G02F 1/136286; G02F 1/136213; G02F 1/1343
See application file for complete search history.

(56) References Cited

U.S. PATENT DOCUMENTS

2005/0248550 A1 11/2005 Kobayashi et al.
2011/0175894 A1* 7/2011 Wakimoto ........... G09G 3/3648
345/212

FOREIGN PATENT DOCUMENTS

JP 11-271707 A 10/1999
JP 2004-212426 A 7/2004
(Continued)

OTHER PUBLICATIONS

Official Communication issued in International Patent Application No. PCT/JP2013/051620, mailed on May 7, 2013.

*Primary Examiner* — Charles Hicks
(74) *Attorney, Agent, or Firm* — Keating & Bennett, LLP

(57) ABSTRACT

A liquid crystal display device includes: a data signal line; a scan signal line; a pixel electrode; a transistor connected to (i) the data signal line, (ii) the scan signal line, and (iii) the pixel electrode; and a common electrode, the liquid crystal display device being configured to turn on the transistor during a power-off sequence by causing a change in an electric potential of the scan signal line, the electric potential of the scan signal line reaching a first electric potential at a first timing after the change is initiated, and the common electrode being in an electrically floating state at a second timing which comes after the first timing. This, in a case where the transistor is turned on in preparation for an operation to turn off a power source of the liquid crystal display device, makes it unlikely for a DC voltage to be applied across a pixel even if potential variation (kickback) occurs at the pixel electrode in reaction to a change in status of the transistor from an on state to an off state.

12 Claims, 44 Drawing Sheets

(51) Int. Cl.
*G09G 3/36* (2006.01)
*G09G 3/04* (2006.01)
*G02F 1/1343* (2006.01)
*G02F 1/1362* (2006.01)
*G02F 1/1368* (2006.01)
*G02F 1/1333* (2006.01)

(52) U.S. Cl.
CPC .... G02F1/136213 (2013.01); G02F 1/136286 (2013.01); G09G 3/3648 (2013.01); G09G 3/3674 (2013.01); *G02F 2001/133397* (2013.01); *G09G 3/3685* (2013.01); *G09G 3/3688* (2013.01); *G09G 2300/0478* (2013.01); *G09G 2310/0245* (2013.01); *G09G 2310/067* (2013.01); *G09G 2320/046* (2013.01); *G09G 2330/027* (2013.01)

(56) References Cited

FOREIGN PATENT DOCUMENTS

| | | |
|---|---|---|
| JP | 2006-011311 A | 1/2006 |
| JP | 2007-047350 A | 2/2007 |
| JP | 2011-170331 A | 9/2011 |

* cited by examiner

FIG. 42 REFERENCE EXAMPLE

REFERENCE EXAMPLE

LIQUID CRYSTAL DISPLAY DEVICE AND LIQUID CRYSTAL DISPLAY DEVICE DRIVING METHOD

TECHNICAL FIELD

The present invention relates to a liquid crystal display device.

BACKGROUND ART

In a case where a DC voltage is applied across a pixel (liquid crystal capacitor including a pixel electrode, a counter electrode, and liquid crystals sandwiched between the pixel electrode and the counter electrode) due to electric charge remaining at the pixel electrode when a liquid crystal display device is turned off, image sticking and/or flickering occur. This ruins the reliability of the liquid crystal display device.

Patent Literature 1 discloses a technology in which a transistor is turned on during a power-off sequence of a liquid crystal display device so as to intentionally discharge electric charge that is remaining at a pixel electrode.

CITATION LIST

Patent Literature

Patent Literature 1
Japanese Patent Application Publication, Tokukai, No. 2006-011311 A

SUMMARY OF INVENTION

Technical Problem

The inventors of the present invention found the following problem: (i) Even if a transistor is turned on during a power-off sequence as is the case of Patent Literature 1, potential variation (kickback) is induced by surrounding parasitic capacitance when the transistor is changed from an on state to an off state (when an electric potential of the transistor changes). This causes a DC voltage to be applied across a pixel (liquid crystal capacitor). (ii) A liquid crystal display device having good off-state characteristics of a transistor, in particular, may cause a DC voltage to be applied across a pixel for an extended period of time (since self-discharge via the transistor is suppressed).

An object of the present invention is to make it unlikely for a DC voltage to be applied across a pixel even if potential variation (kickback) occurs at a pixel electrode in reaction to a change in status of a transistor from an on state to an off state in a case where the transistor is turned on during a power-off sequence of a liquid crystal display device.

Solution to Problem

A liquid crystal display device of the present invention includes: a data signal line; a scan signal line; a pixel electrode; a transistor connected to (i) the data signal line, (ii) the scan signal line, and (iii) the pixel electrode; and a common electrode, the liquid crystal display device being configured to turn on the transistor during a power-off sequence by causing a change in an electric potential of the scan signal line, the electric potential of the scan signal line reaching a first electric potential at a first timing after the change is initiated, and the common electrode being in an electrically floating state at a second timing which comes after the first timing.

With the configuration, it is possible to cause the pixel electrode to discharge electric charge by turning on the transistor after the first timing of the power-off sequence. In addition, since the common electrode goes into an electrically floating state at the second timing, the electric potential of the common electrode changes in accordance with the change in the electric potential of the pixel electrode even if kickback occurs in reaction to a change in status of the transistor from an on state to an off state.

Advantageous Effects of Invention

A liquid crystal display device of the present invention makes it unlikely for a DC voltage to be applied across a pixel even if kickback occurs at a pixel electrode in reaction to a change in status of a transistor from an on state to an off state in a case where the transistor is turned on during a power-off sequence.

DESCRIPTION OF EMBODIMENTS

The following description will discuss embodiments of the present invention with reference to FIGS. 1 through 44.

Embodiment 1

Figure 2:
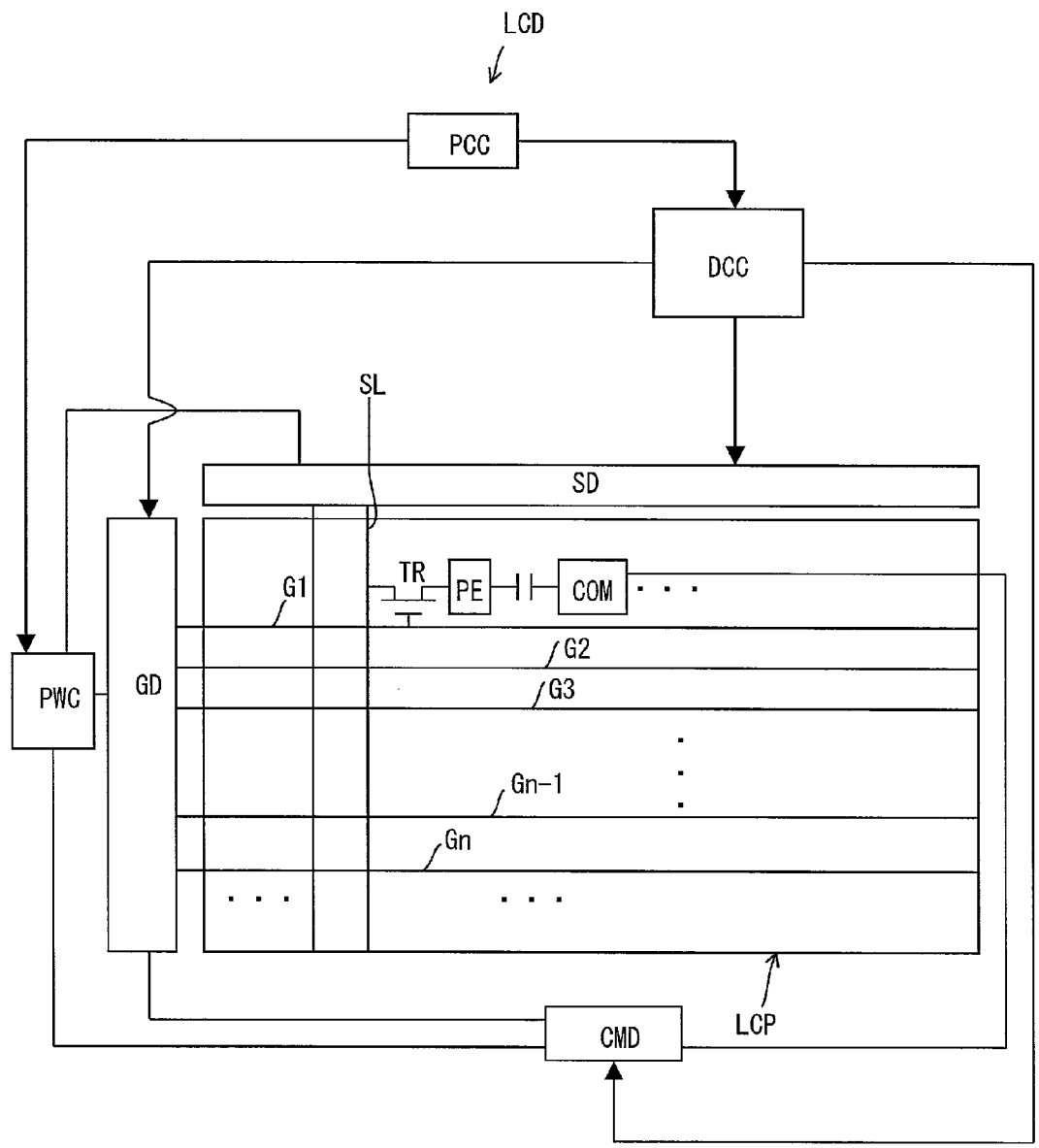
FIG. 2 is a block diagram illustrating a liquid crystal display device of Embodiment 1.
Figure 3:
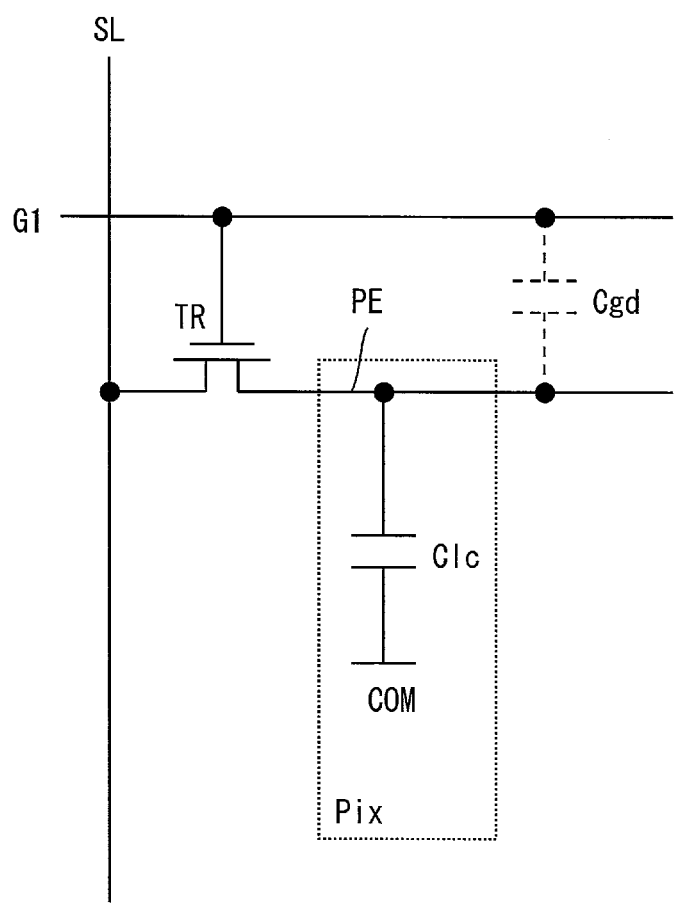
FIG. 3 is an equivalent circuit diagram illustrating part of the configuration illustrated in FIG. 2.

FIG. 2 is a block diagram illustrating a configuration of a liquid crystal display device of the present embodiment. FIG. 3 is an equivalent circuit diagram illustrating part of the configuration illustrated in FIG. 2. As illustrated in FIGS. 2 and 3, a liquid crystal display device LCD of Embodiment 1 includes (i) a liquid crystal panel LCP including two substrates (not illustrated) and a liquid crystal layer (not illustrated) sandwiched between the two substrates, (ii) a display control circuit DCC, (iii) a source driver SD, (iv) a gate driver GD, (v) a common electrode driver CMD, (vi) a power supply circuit PWC, and (vii) a power supply control circuit PCC.

The liquid crystal panel LCP includes scan signal lines G1 through Gn, a data signal line SL, a pixel electrode PE, a transistor (thin film transistor, TFT) TR, and a common electrode COM. The transistor TR has (i) a gate electrode which is connected to the scan signal line G1, (ii) a source electrode which is connected to a the data signal line SL, and (iii) a drain electrode which is connected to the pixel electrode PE. As illustrated in FIG. 3, a pixel capacitance (liquid crystal capacitance) Clc is formed by (a) the pixel electrode PE and the common electrode COM of a pixel Pix and (b) the liquid crystal layer. Note that a parasitic capacitance Cgd is formed between the gate electrode (scan signal line G1) of the transistor TR and the drain electrode (pixel electrode PE) of the transistor TR.

The source driver SD drives the data signal line SL. The gate driver GD drives the scan signal lines G1 through Gn. The common electrode driver CMD drives the common electrode COM. The display control circuit DCC (i) includes a timing controller and an image processing circuit and (ii) controls the source driver SD, the gate driver GD, and the common electrode driver CMD. The power supply control circuit PCC controls the power supply circuit PWC in response to instruction from a user or a system. The power supply circuit PWC is controlled by the power supply control circuit PCC to supply various power supply voltages to the source driver SD, the gate driver GD, and the common electrode driver CMD.

Figure 1:
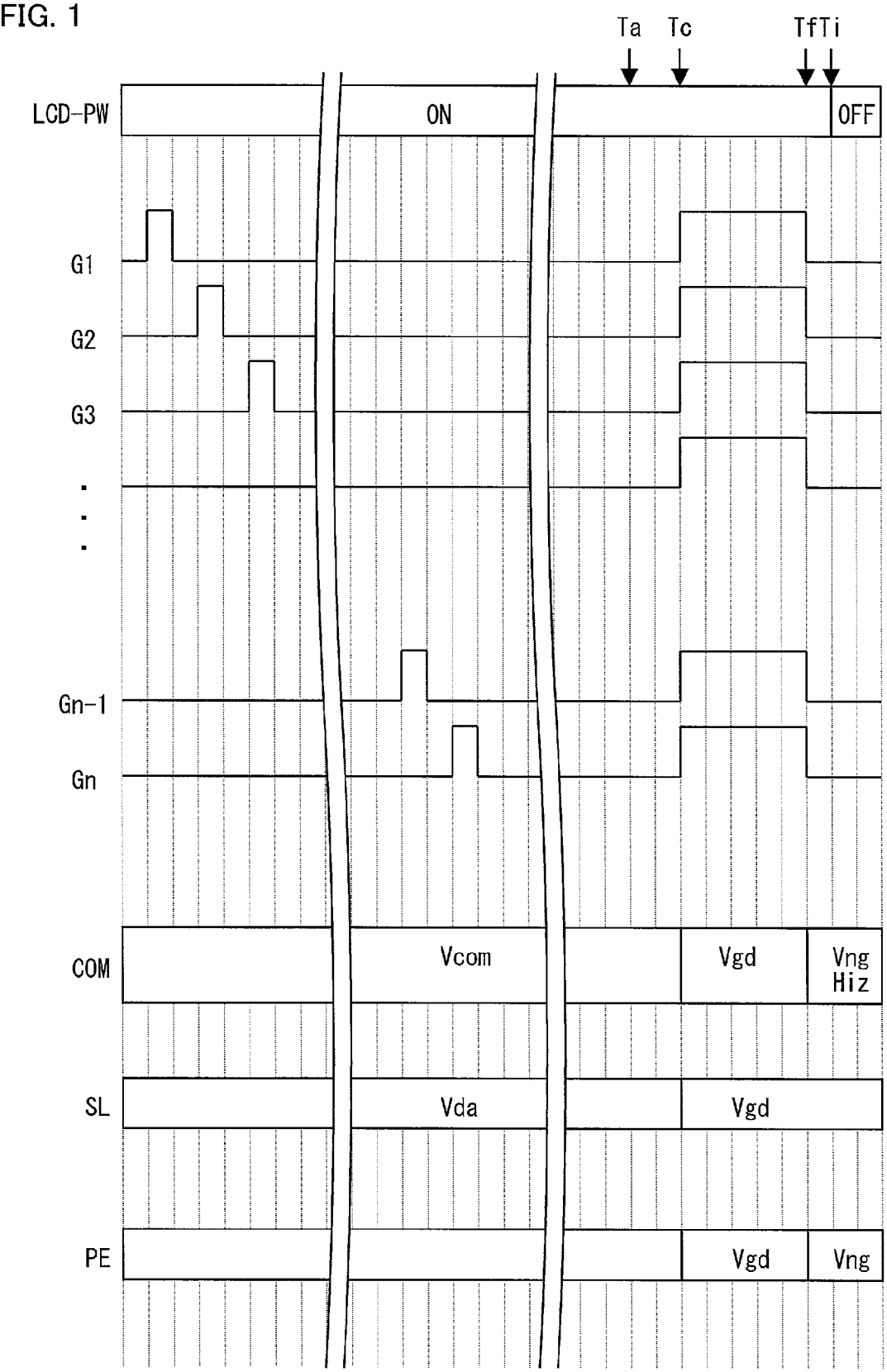
FIG. 1 is a timing chart showing a power-off sequence of Embodiment 1.

The liquid crystal display device of Embodiment 1 is configured such that in a case where instruction is given at time Ta to turn off a power supply, (i) the transistor TR is turned off at time Tc (first timing) by simultaneously scanning the scan signal lines G1 through Gn, (ii) a ground potential Vgd is supplied to the data signal line SL and to the common electrode COM at the time Tc, and (iii) the common electrode COM goes into an electrically floating state at time Tf (second timing) which comes after the time Tc (see FIG. 1).

Figure 4:
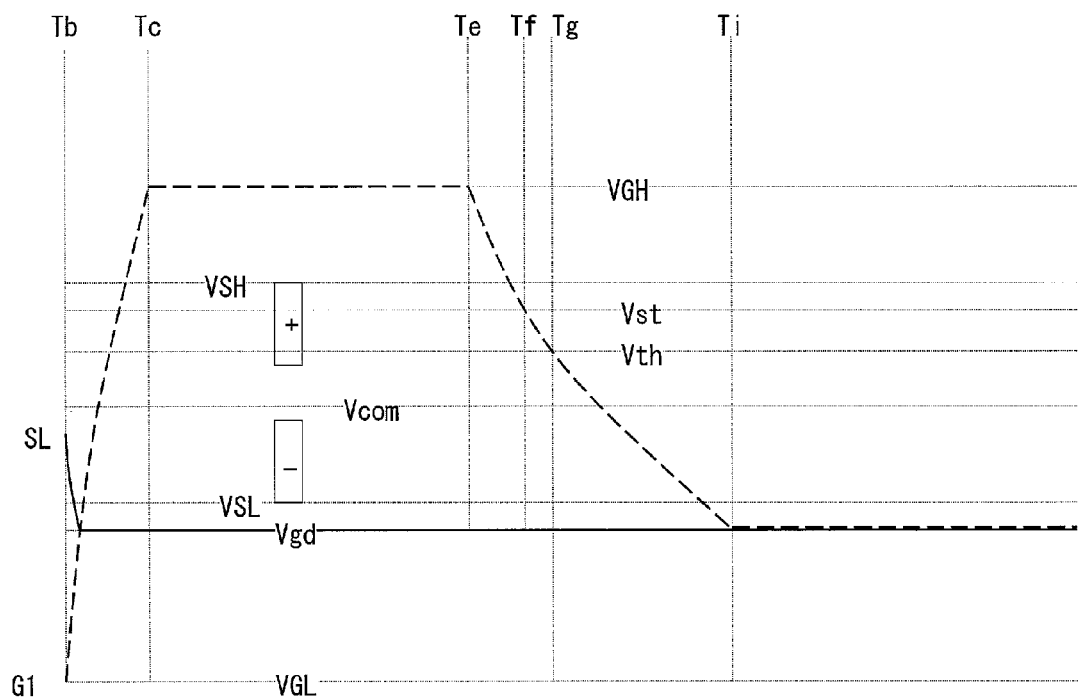
FIG. 4 is a timing chart showing the power-off sequence (including potential variation at a data signal line) of FIG. 1.
Figure 5:
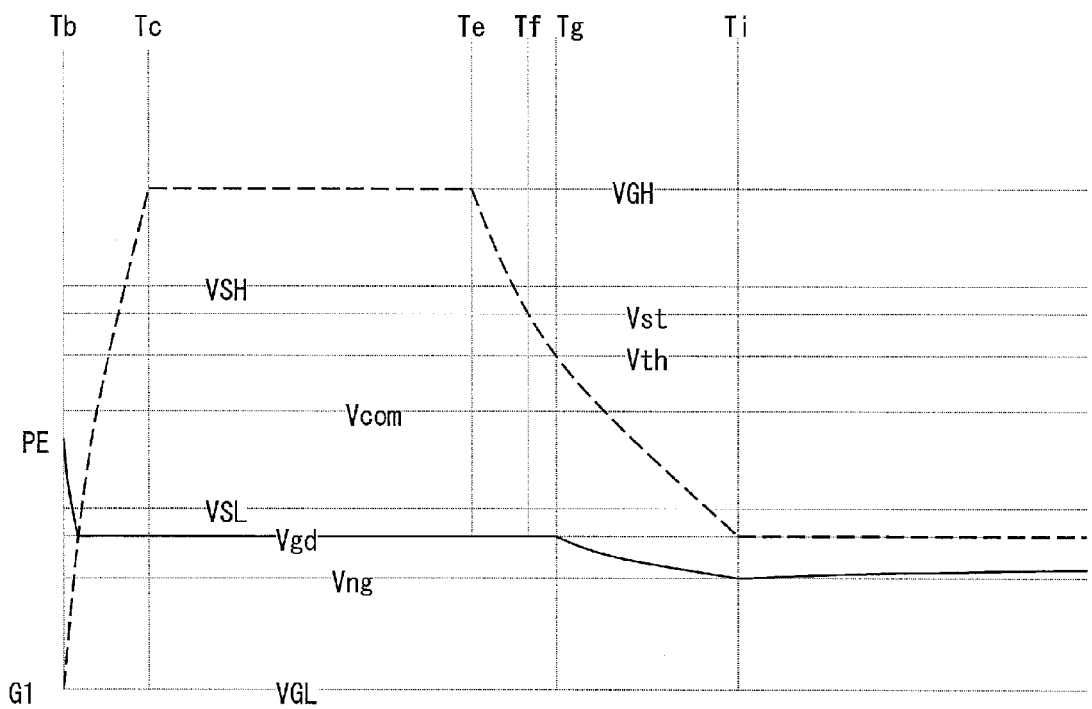
FIG. 5 is a timing chart showing the power-off sequence (including potential variation at a pixel electrode) of Embodiment 1.
Figure 6:
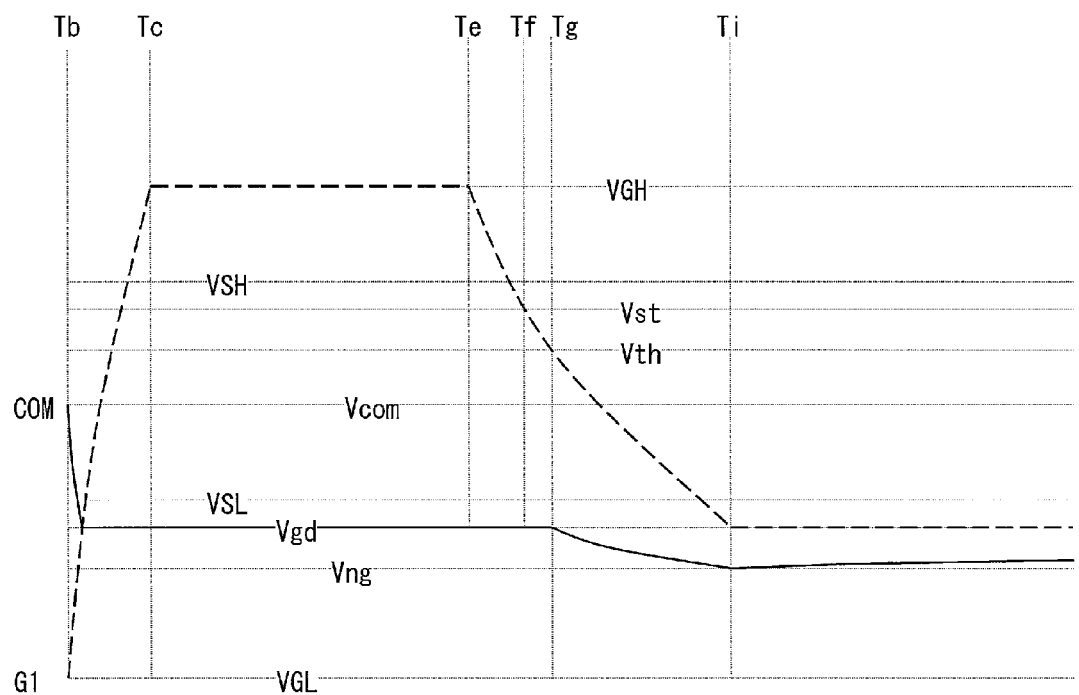
FIG. 6 is a timing chart showing the power-off sequence (including potential variation at a common electrode).

The details (sequence after the time Tb) of FIG. 1 are shown in FIGS. 4 through 6. It is assumed that (i) the liquid crystal panel LCP is of a normally-black type and the transistor TR is of an n-channel type and (ii) the following is true: gate-off potential VGL<negative potential Vng<ground potential Vgd<during-negative-driving lowest gradation potential VSL<display center potential Vcom (potential of common electrode during normal display)<transistor threshold potential Vth<specified potential Vst<during-positive-driving highest gradation potential VSH<gate-on potential VGH.

First, during a period between the time Tb and time Tc (first timing), (i) the transistor TR is turned on by causing an electric potential of the scan signal line G1 to rise up to an electric potential (first electric potential; e.g. gate-on potential VGH) higher than a threshold potential Vth of the transistor and (ii) the ground potential Vgd (third electric potential) is supplied to the data signal line SL and to the common electrode COM.

At time Te which comes after the Tc, the electric potential of the scan signal line G1 turns downwards. At time Tf (second timing) at which the electric potential of the scan signal line G1 reaches a specified potential Vst (second electric potential), the common electrode COM goes in an electrically floating state (high impedance).

At time Tg which follows the time Tf, the electric potential of the scan signal line G1 falls lower than the threshold potential Vth of the transistor. This causes the transistor TR to be turned off. Then, during a period between the time Tg and time Ti, the electric potential of the scan signal line G1 decreases from the threshold potential Vth of the transistor to the ground potential Vgd. During the period between the time Tg and the time Ti, the transistor TR is turned off (an electric resistance between the source electrode of the transistor TR and the pixel electrode PE is extremely high). This, along with the parasitic capacitance Cgd, causes an electric potential of the pixel electrode PE to decrease from the ground potential Vgd to a negative potential Vng (kickback; see FIG. 5). Meanwhile, since the common electrode COM is in an electrically floating state during this period, the electric potential of the common electrode COM also decreases from the ground potential Vgd to the negative potential Vng (see FIG. 6).

Since the common electrode COM is in a floating state during a period after the time Ti, the electric potential of the common electrode COM gradually increases toward the ground potential Vgd by an effect of self-discharge (see FIG. 6). The transistor TR is turned off during this period. This, along with the gradual increase in the electric potential of the common electrode COM, causes the electric potential of the pixel electrode PE to gradually increase from the negative potential Vng (see FIGS. 5 and 6).

According to Embodiment 1, the common electrode COM goes into an electrically floating state at the time Tf. This brings about such an effect that there is hardly an electric potential difference between the pixel electrode PE and the common electrode COM (i.e. a DC voltage is unlikely to be applied across the pixel Pix) even in a case where potential variation (kickback) occurs at the pixel electrode PE after the time Tg at which the transistor TR is turned off.

Figure 40:
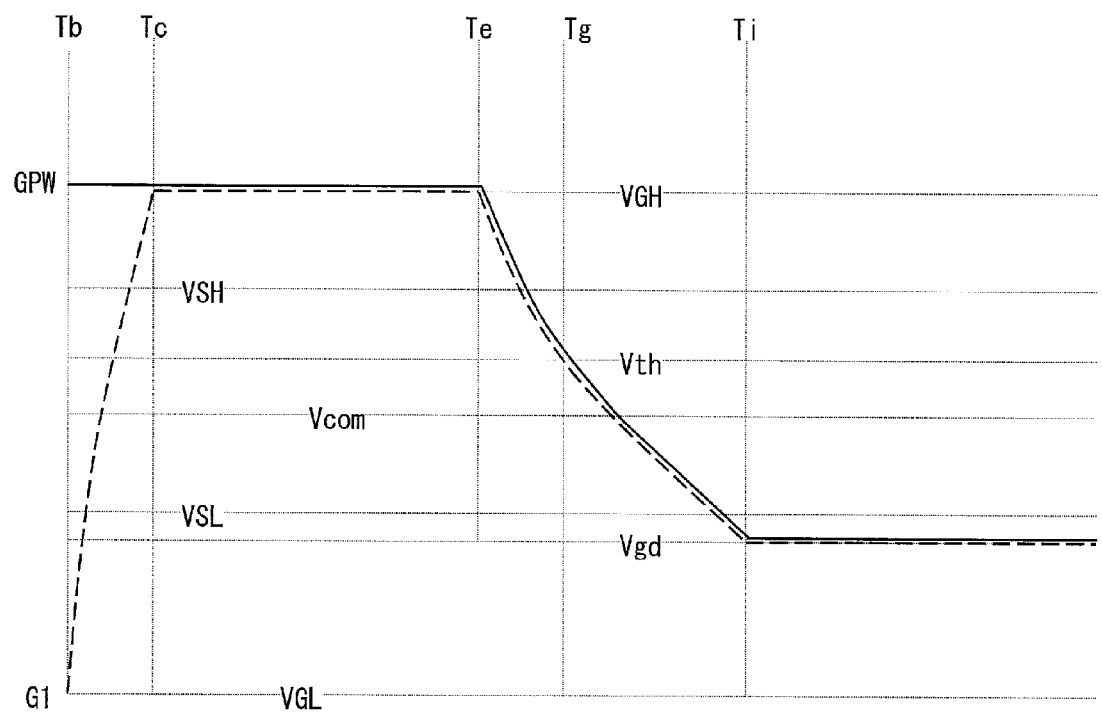
FIG. 40 is a timing chart showing an example of supplying power to drivers in each embodiment.
Figure 41:
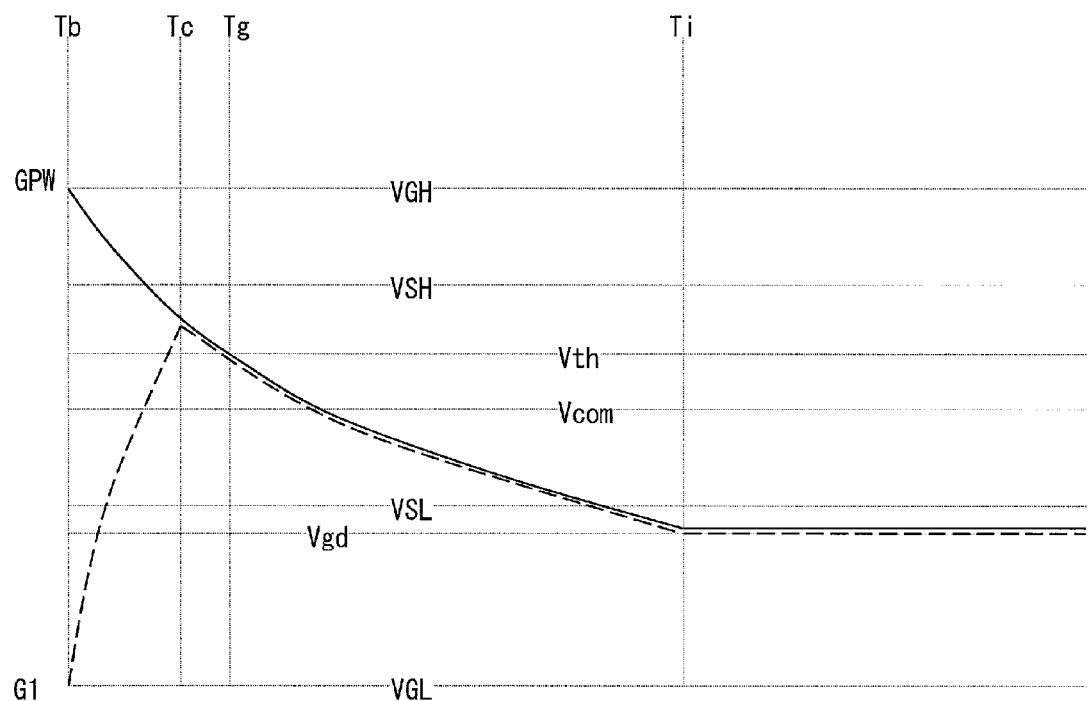
FIG. 41 is a timing chart showing an example of a correlation between an electric potential of a scan signal line and how power is supplied to a driver in each embodiment.
Figure 42:
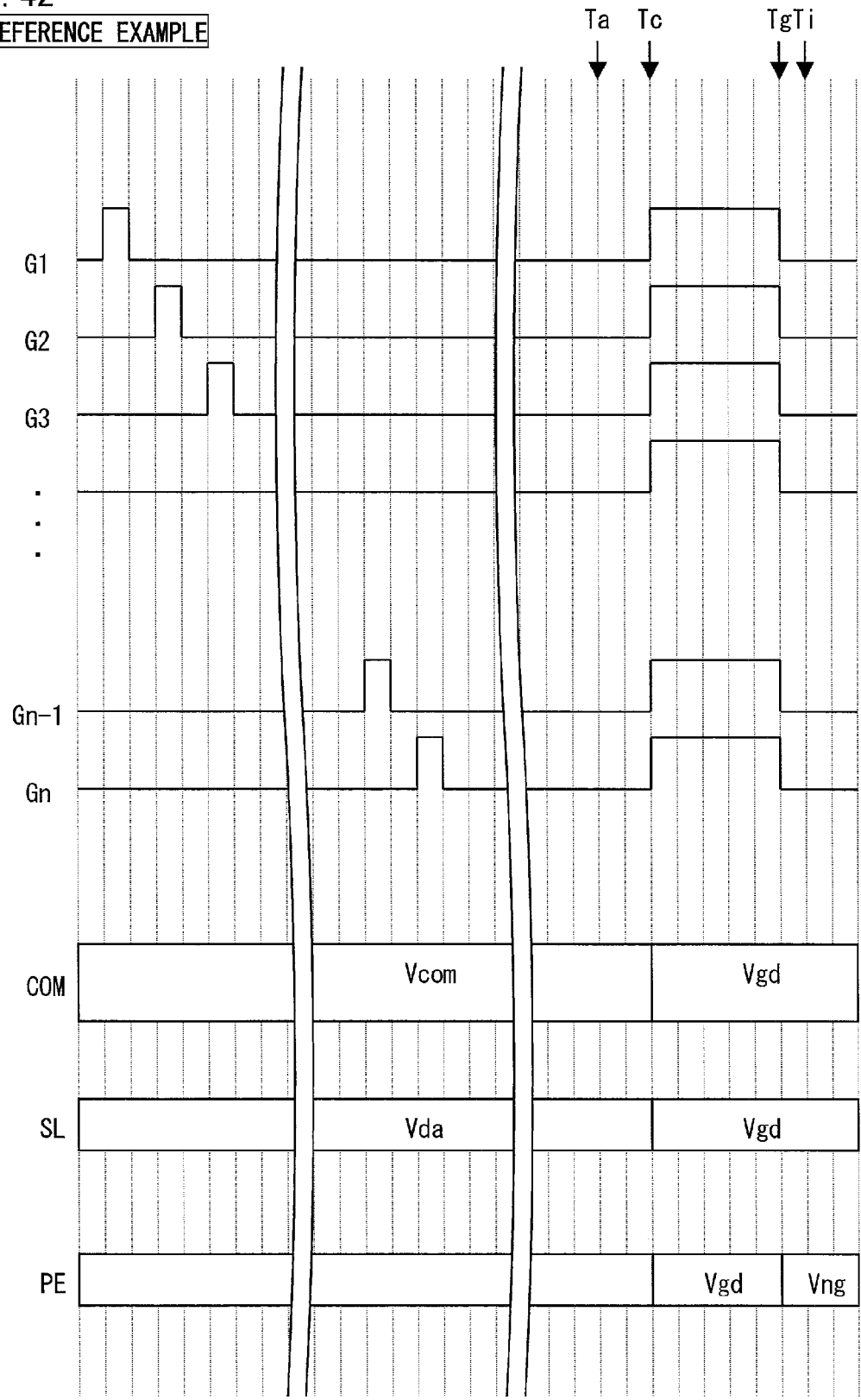
FIG. 42 is a timing chart showing a power-off sequence of a reference example.
Figure 43:
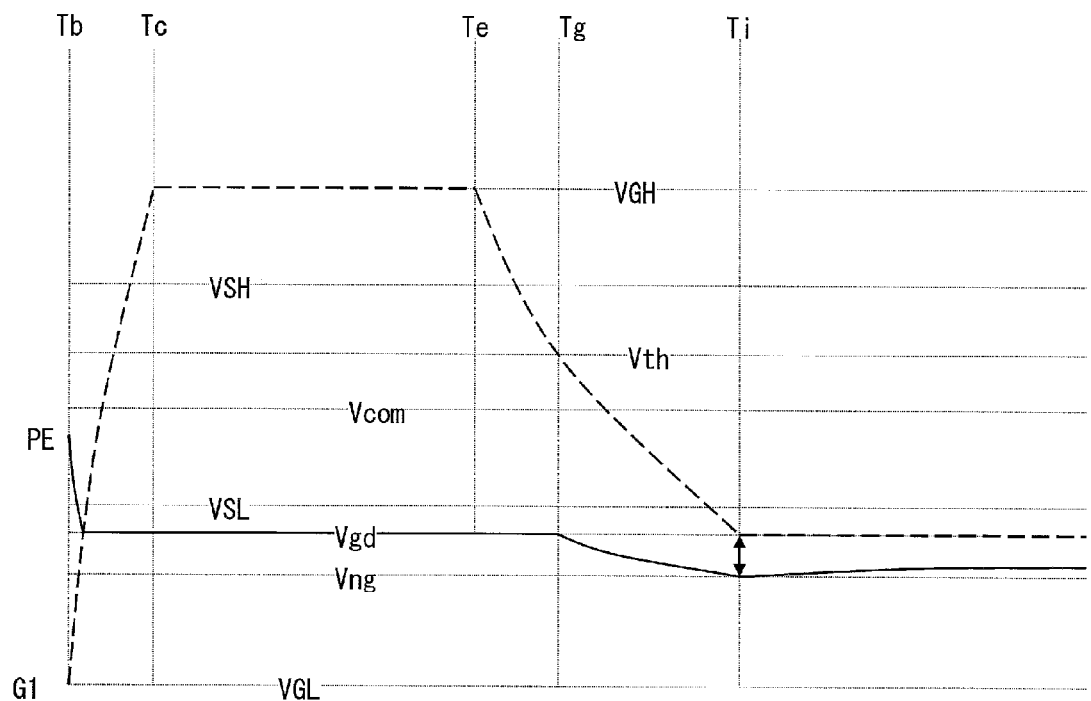
FIG. 43 is a timing chart showing the power-off sequence (including potential variation at a common electrode) of the reference example.
Figure 44:
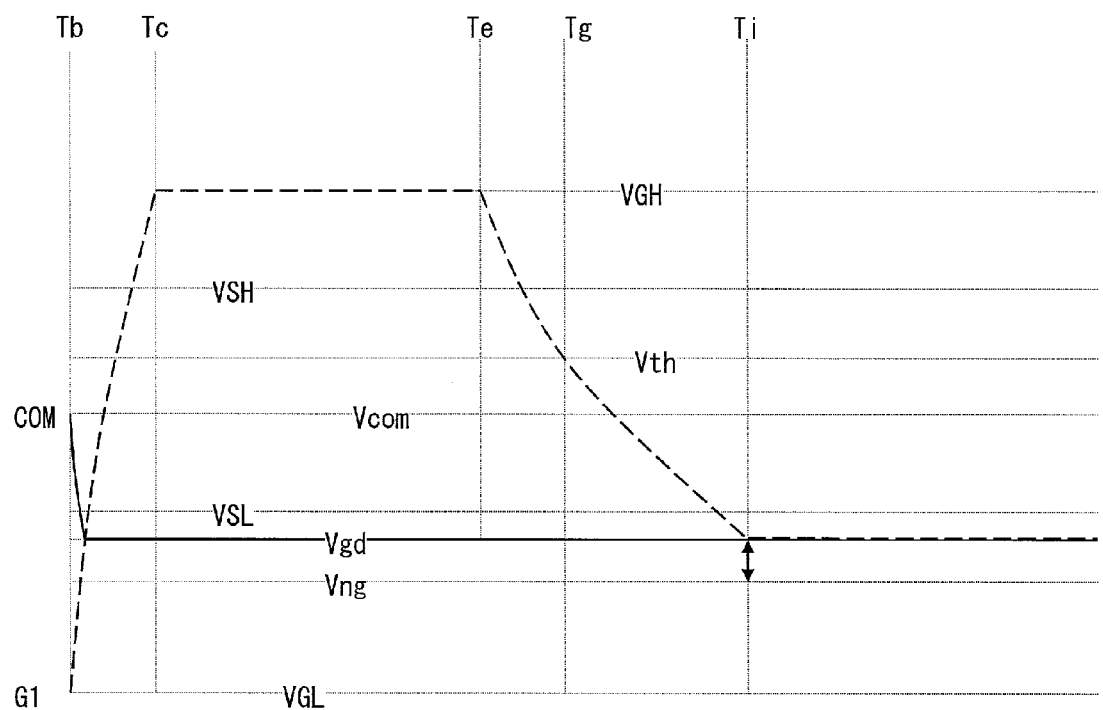
FIG. 44 is a timing chart showing the power-off sequence (including potential variation at a pixel electrode) of the reference example.

FIGS. 40 through 42 are views showing reference examples in which the common electrode COM is not in an electrically floating state at the time Tf. These examples indicate that, after time Tg at which the transistor TR is turned off, potential variation (kickback) at the pixel electrode PE causes a DC voltage to be applied across the pixel electrode PE and the common electrode COM (i.e. pixel Pix) even after the power supply is turned off (until self-discharge via the transistor TR ends). In particular, in a case where an oxide semiconductor (e.g. oxide semiconductor InGaZnOx containing indium, gallium, and zinc) is used for a semiconductor layer of the transistor TR, on-state/off-state characteristics are so excellent as to prevent self-discharge from easily occurring (described later). This causes the DC voltage to be applied across the pixel Pix for an extended period of time. In other words, in a case where an oxide semiconductor is used for the semiconductor layer of the transistor TR, the effect of Embodiment 1 becomes significant.

Figure 7:
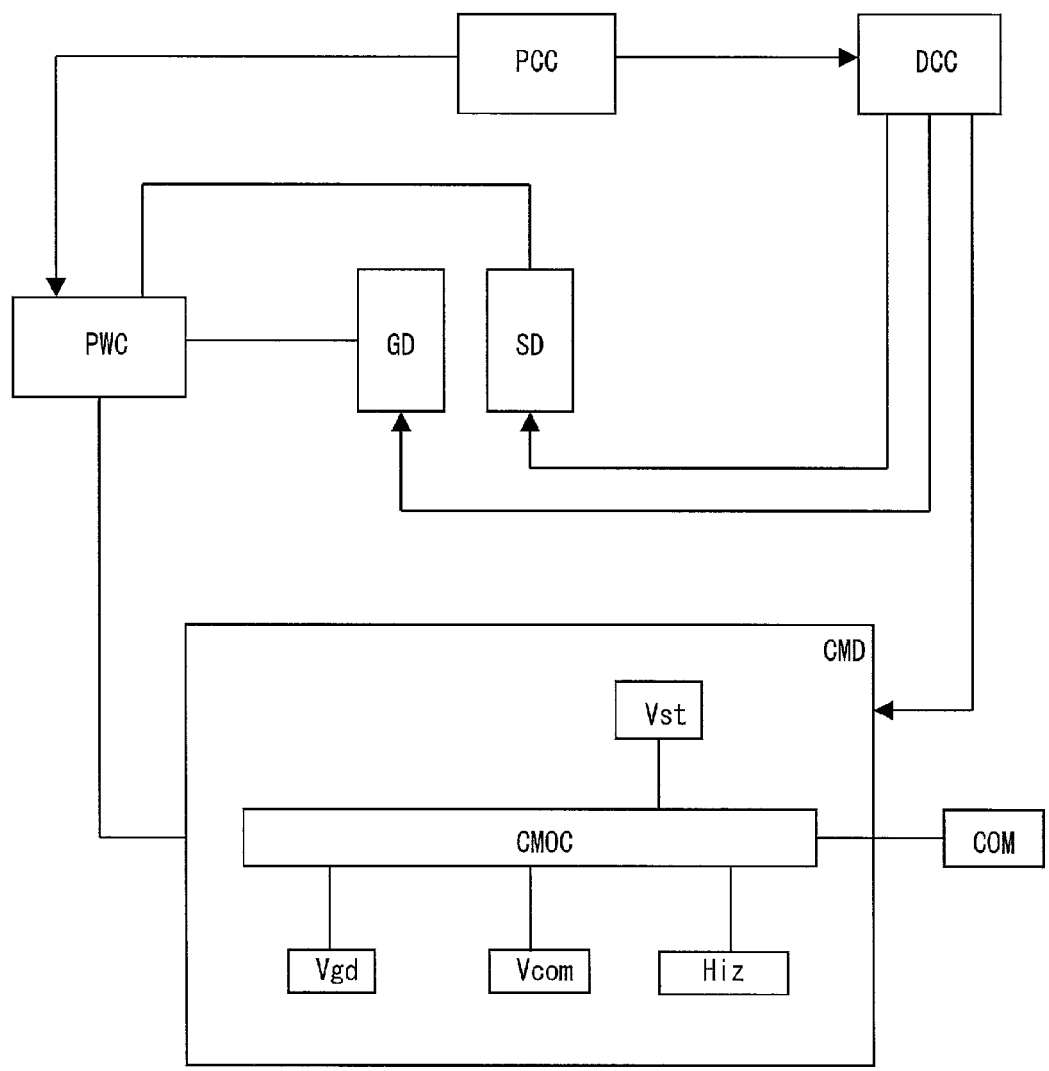
FIG. 7 is a block diagram illustrating a configuration of the liquid crystal display device of Embodiment 1.
Figure 8:
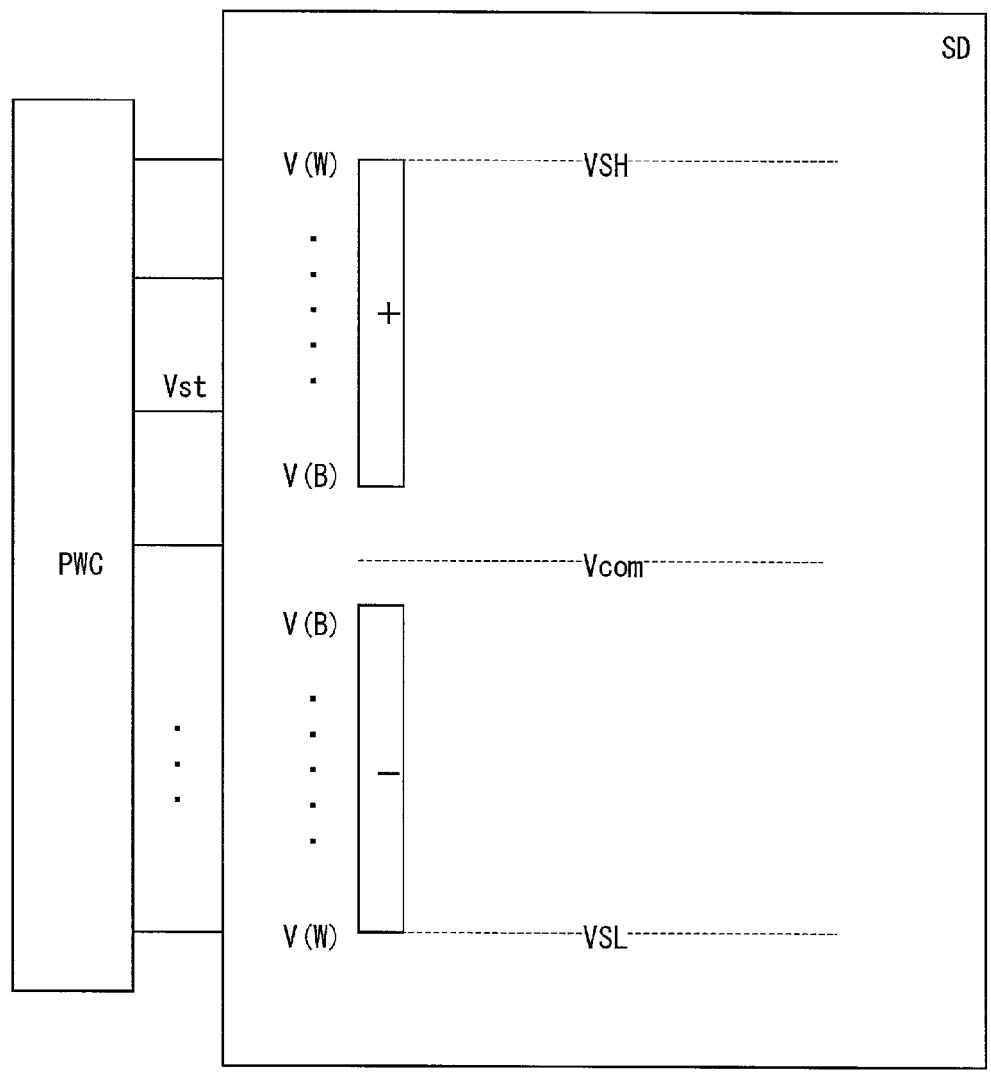
FIG. 8 is a view schematically illustrating a configuration of a source driver illustrated in FIG. 2.

FIGS. 7 and 8 show a specific example in which the power-off sequence of Embodiment 1 is achieved. As illustrated in FIG. 7, the common electrode driver CMD includes a common electric potential output circuit CMOC. In response to instruction from the display control circuit DCC, the common electric potential output circuit CMOC causes, at time Tb, an output electric potential supplied the common electrode COM to be switched from the display center potential Vcom to the ground potential Vgd. The power supply control circuit PCC monitors a power source potential which is supplied from the power supply circuit PWC to the gate driver GD. When the power source potential reaches the specified potential Vst (see FIGS. 5 and 6) generated in the power supply circuit PWC, the power supply control circuit PCC provides the display control circuit DCC with notification (that the power source potential from the power supply circuit PWC has reached the specified potential Vst). In response to the notification, the display control circuit DCC provides the common electric potential output circuit CMOC with instruction which causes the common electric potential output circuit CMOC to switch the output electric potential (supplied to the common electrode COM) from the ground potential Vgd to a high impedance Hiz.

Note that, as illustrated in FIG. 8, the source driver SD generates, in accordance with a plurality of electric potentials (supplied electric potentials) supplied from the power supply circuit PWC, gradation potentials (for both positive-driving and negative-driving) ranging from a lowest gradation potential V(B), which corresponds to black color, to a highest gradation potential V(W), which corresponds to white color. That said, it is possible to cause the specified potential Vst to be equal to (common with) one of the plurality of supplied electric potentials.

Figure 9:
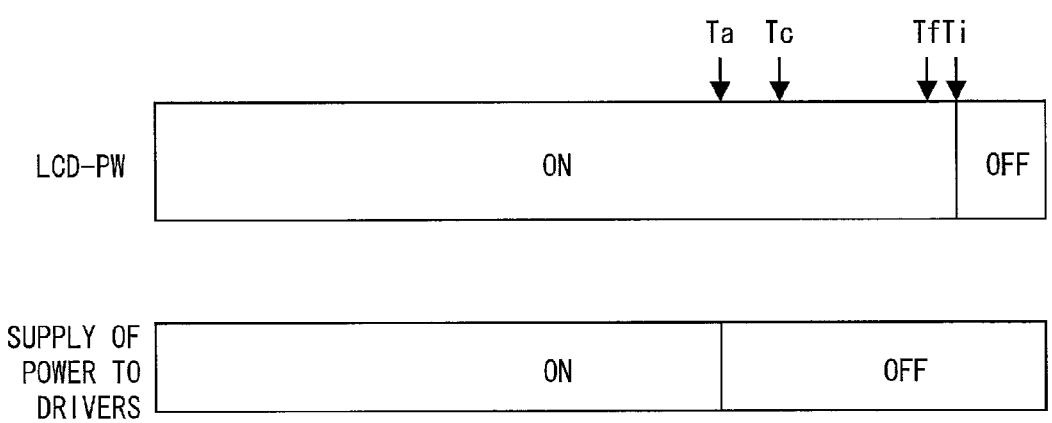
FIG. 9 is a timing chart illustrating how power is supplied to drivers in Embodiment 1.

According to the Embodiment 1, as illustrated in FIG. 9, the power supply circuit PWC stops, at the time Ta, supplying power to the drivers D (GD, SD, and CMD). Then, a sequence from the time Ta through time Ti is carried out, depending on residual voltages of the drivers D (GD, SD, and CMD). Note, however, that the power supply circuit PWC can supply power to the drivers until the time Ti.

Figure 10:
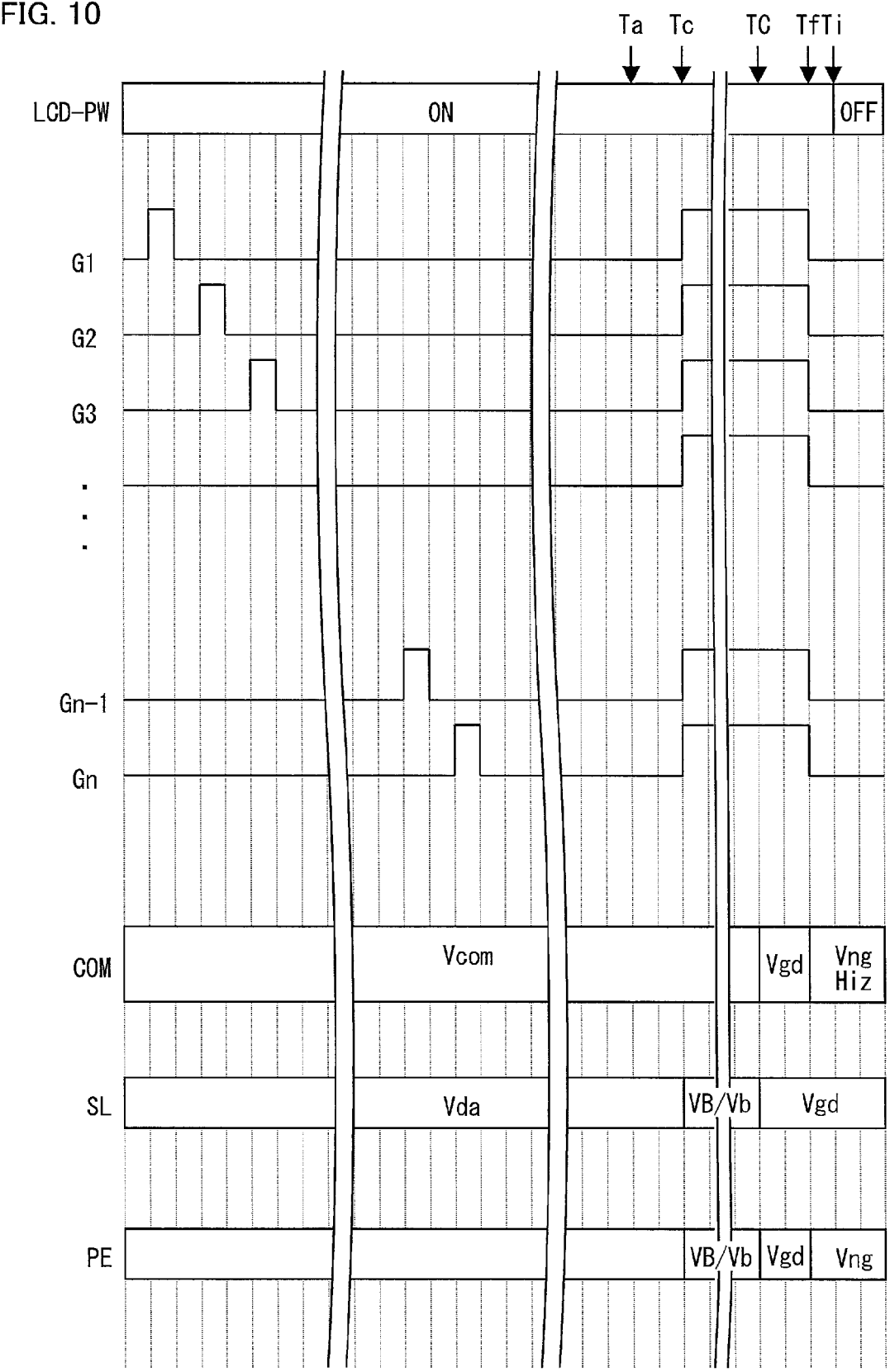
FIG. 10 is a timing chart showing a modification of the power-off sequence illustrated in FIG. 1.

According to Embodiment 1, as illustrated in FIG. 10, a period between the time Tc (at which the electric potential of the scan signal line G1 rises) and time TC (after the time Tc and before the time Tf) can be set as a black-display period. During the black-display period, the common electrode COM receives a Vcom (fourth electric potential) whereas the data signal line alternately receives (i) a black-display potential VB (fifth electric potential) higher than the Vcom and (ii) a black-display potential Vb (fifth electric potential) lower than the Vcom. At time TC at which the black-display period ends, the data signal line SL and the common electrode COM each receive the ground potential Vgd.

Embodiment 2

Figure 11:
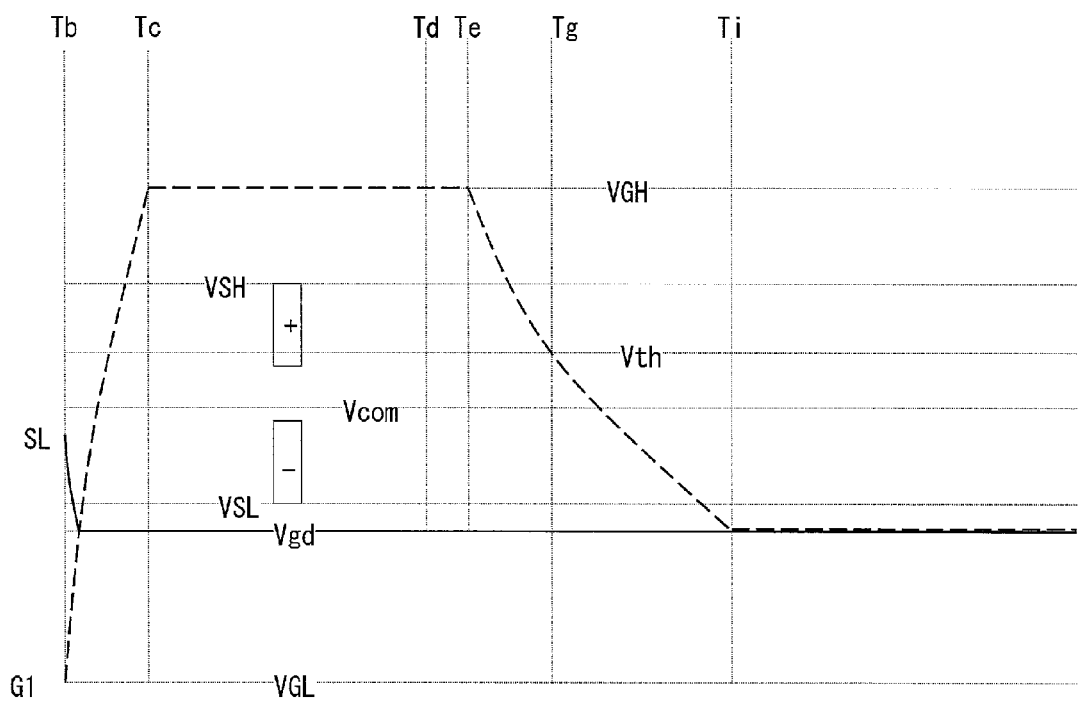
FIG. 11 is a timing chart showing the power-off sequence (including potential variation at a data signal line) of Embodiment 2.
Figure 12:
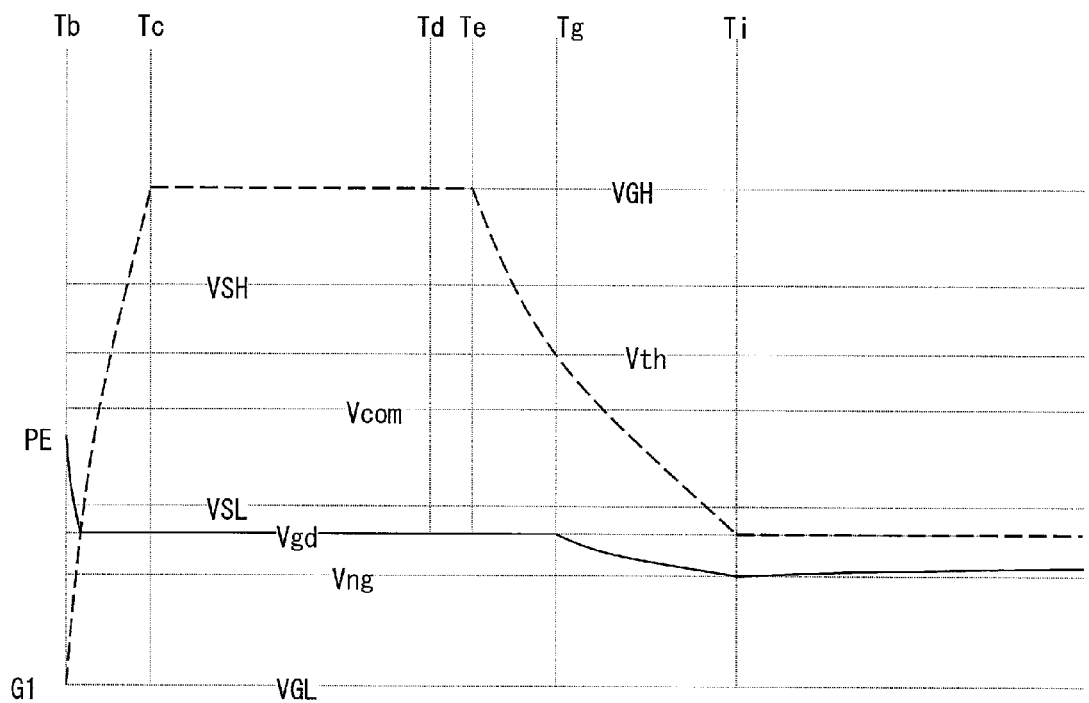
FIG. 12 is a timing chart showing the power-off sequence (including potential variation at a pixel electrode) of Embodiment 2.
Figure 13:
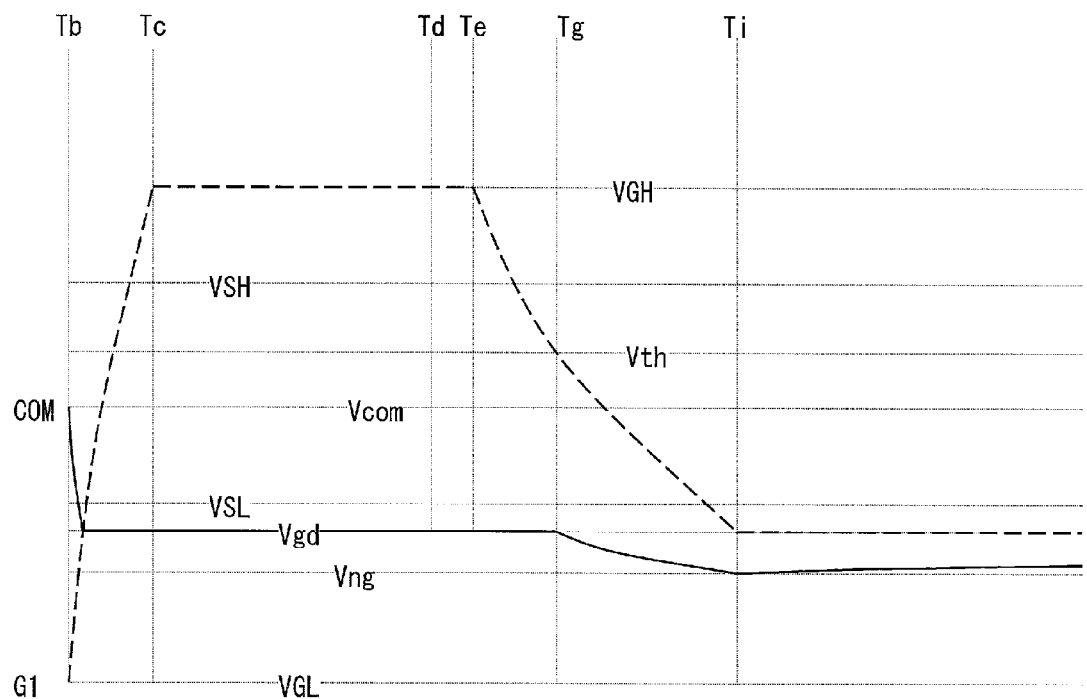
FIG. 13 is a timing chart showing the power-off sequence (including potential variation at a common electrode) of Embodiment 2.

A configuration of a liquid crystal display device in accordance with Embodiment 2 is as illustrated in FIG. 2. According to Embodiment 1, the common electrode COM goes into an electrically floating state at the time Tf which is after the electric potential of the scan signal line G1 starts decreasing from the gate-on potential VGH. However, the present invention is not limited to such a configuration. As illustrated in FIGS. 11 through 13, it is possible to configure the common electrode COM to go in to an electrically floating state during a period of time (i) after time Tc at which an electric potential of a scan signal line G1 reaches a gate-on potential VGH and (ii) before time Te at which the electric potential of the scan signal line G1 starts decreasing from the gate-on potential VGH (for example, at time Td shown in FIG. 13).

Embodiment 3

Figure 14:
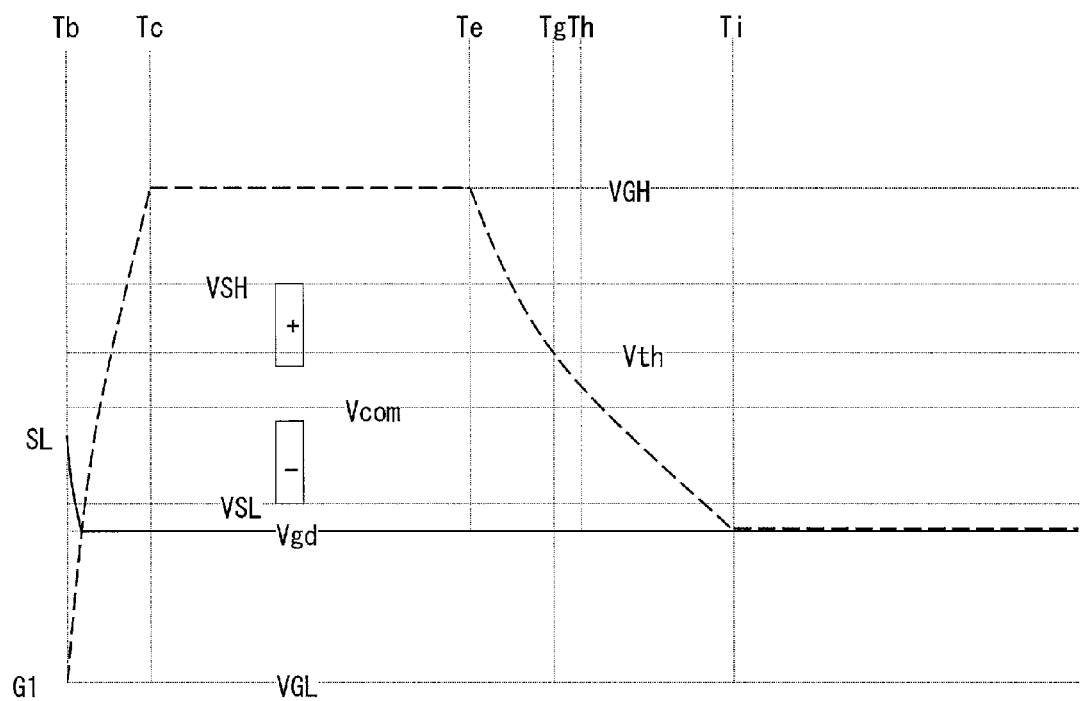
FIG. 14 is a timing chart showing the power-off sequence (including potential variation at a data signal line) of Embodiment 3.
Figure 15:
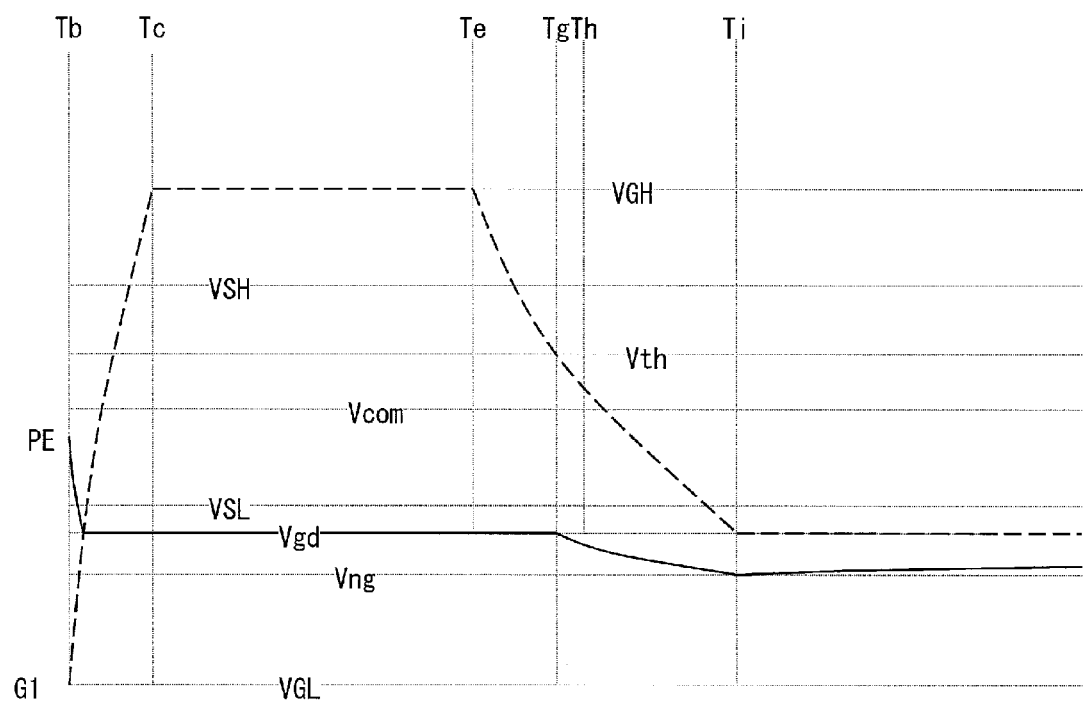
FIG. 15 is a timing chart showing the power-off sequence (including potential variation at a pixel electrode) of Embodiment 3.
Figure 16:
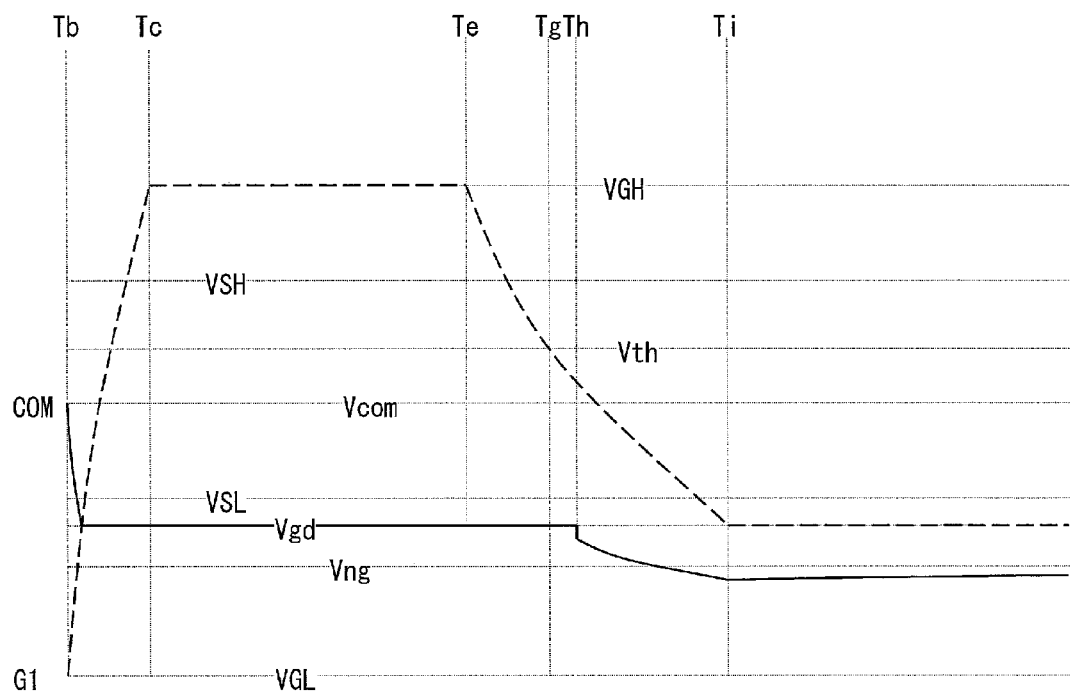
FIG. 16 is a timing chart showing the power-off sequence (including potential variation at a common electrode) of Embodiment 3.

A liquid crystal display device of Embodiment 3 is as illustrated in FIG. 2. According to Embodiment 1, the common electrode COM goes into an electrically floating state at the time Tf which is before the electric potential of the scan signal line G1 reaches the threshold potential Vth of the transistor. However, the present invention is not limited to such a configuration. As illustrated in FIGS. 14 through 16, it is possible to configure the common electrode COM to go into an electrically floating state during a period of time (i) after time Tg at which an electric potential of a scan signal line G1 reaches a threshold potential Vth of a transistor and (ii) before time Ti at which the electric potential of the scan signal line G1 reaches a ground potential Vgd (for example, at time Th shown in FIG. 16).

Embodiment 4

Figure 17:
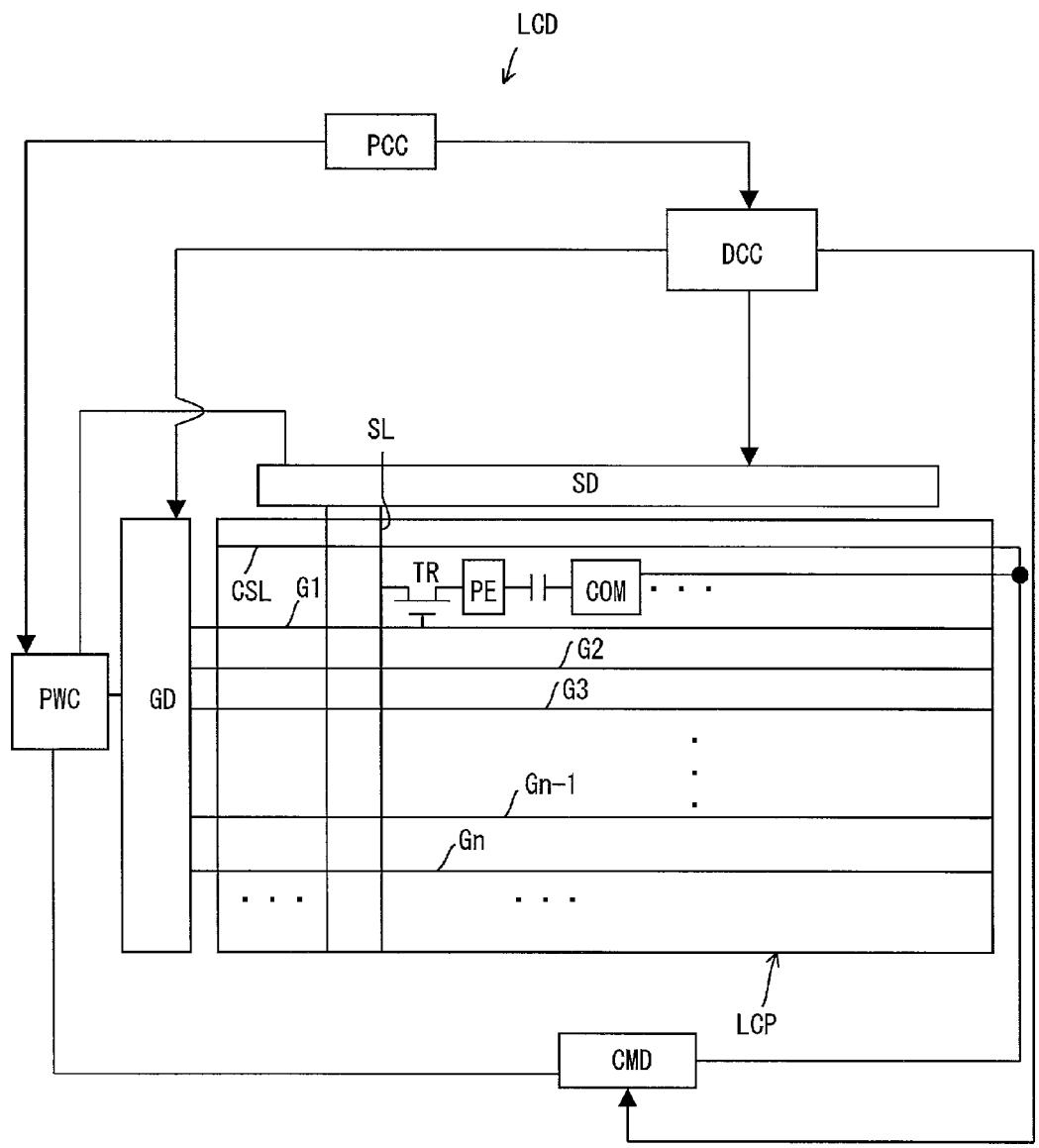
FIG. 17 is a block diagram illustrating a liquid crystal display device of Embodiment 4.
Figure 18:
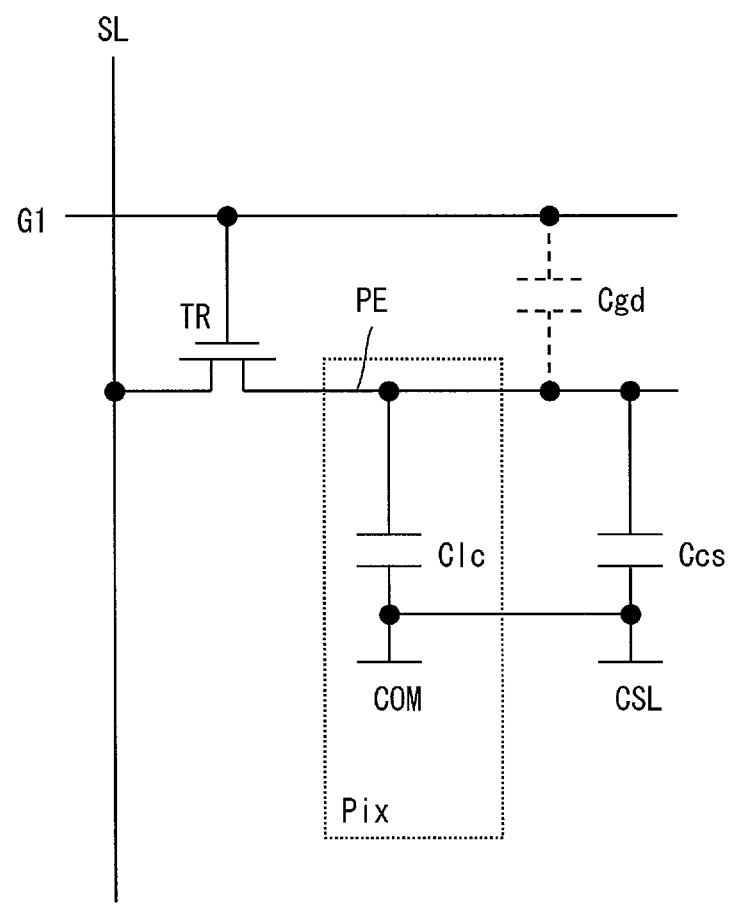
FIG. 18 is an equivalent circuit diagram illustrating part of the liquid crystal display device illustrated in FIG. 17.

FIG. 17 is a block diagram illustrating a configuration of a liquid crystal display device in accordance with Embodiment 4. FIG. 18 is an equivalent circuit diagram illustrating part of the configuration illustrated in FIG. 17. As illustrated in FIGS. 17 and 18, a liquid crystal display device LCD of Embodiment 4 is (i) configured to further include a CS line CSL as compared with the liquid crystal panel illustrated in FIG. 2 and (ii) configured such that a retention capacitance Ccs is formed by the CS line CSL, a pixel electrode PE, and an insulating layer (for example, a gate insulating film and a channel protection film) sandwiched between the CS line CSL and the pixel electrode PE. Note that the CS line CSL is electrically connected to a common electrode COM, and is driven by a common electrode driver CMD.

Figure 19:
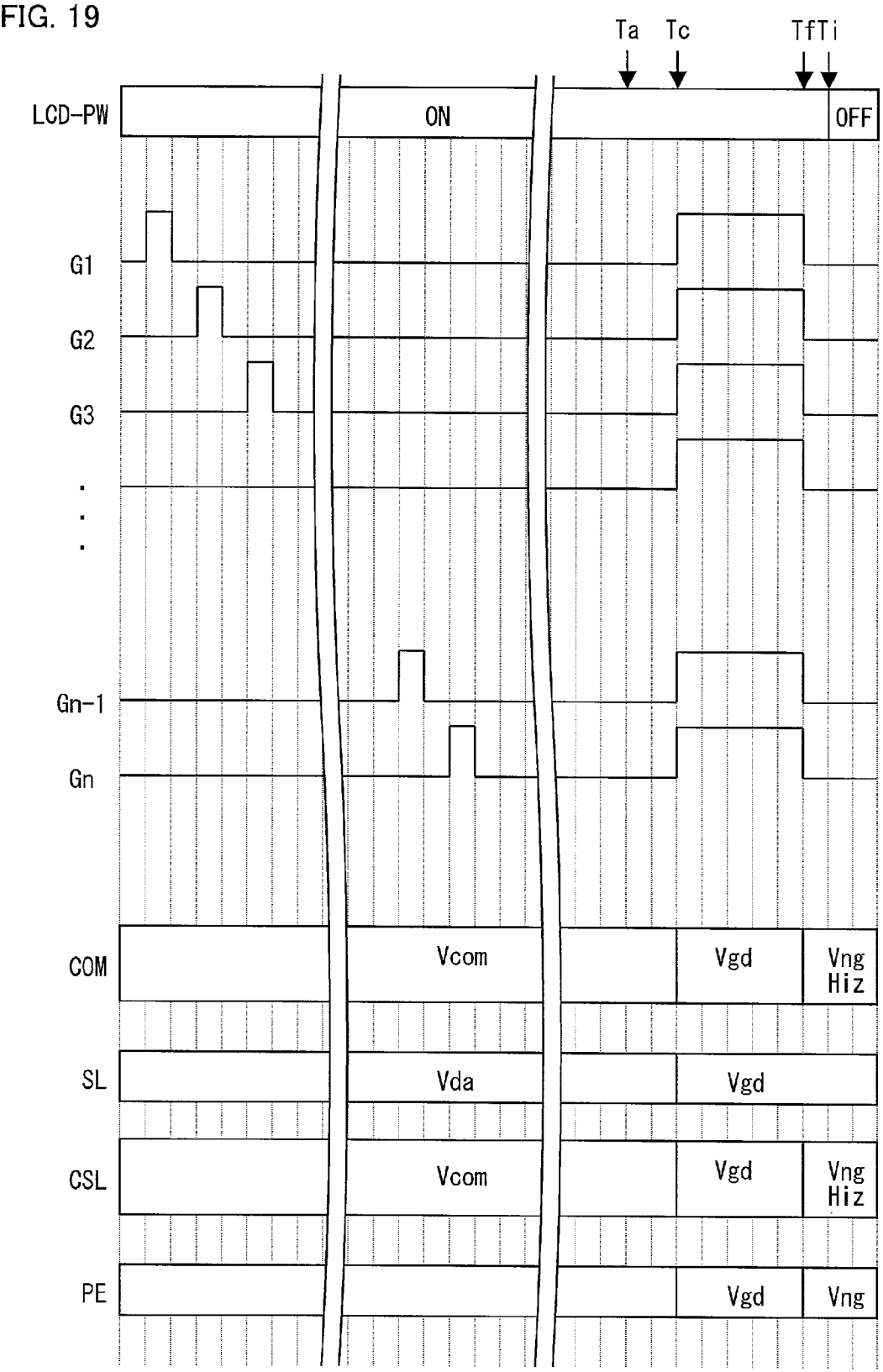
FIG. 19 is a timing chart showing a power-off sequence of Embodiment 4.

The liquid crystal display device of Embodiment 4 is configured such that, in a case where instruction is given at time Ta to turn off a power supply, (i) a transistor TR is turned on at time Tc (first timing) by simultaneously scanning scan signal lines G1 through Gn, (ii) a ground potential Vgd is supplied to a data signal line SL, the common electrode COM, and the CS line CSL at the time Tc, and (iii) the common electrode COM and the CS line CSL go into an electrically floating state at time Tf (second timing) which comes after the time Tc (see FIG. 19).

Figure 20:
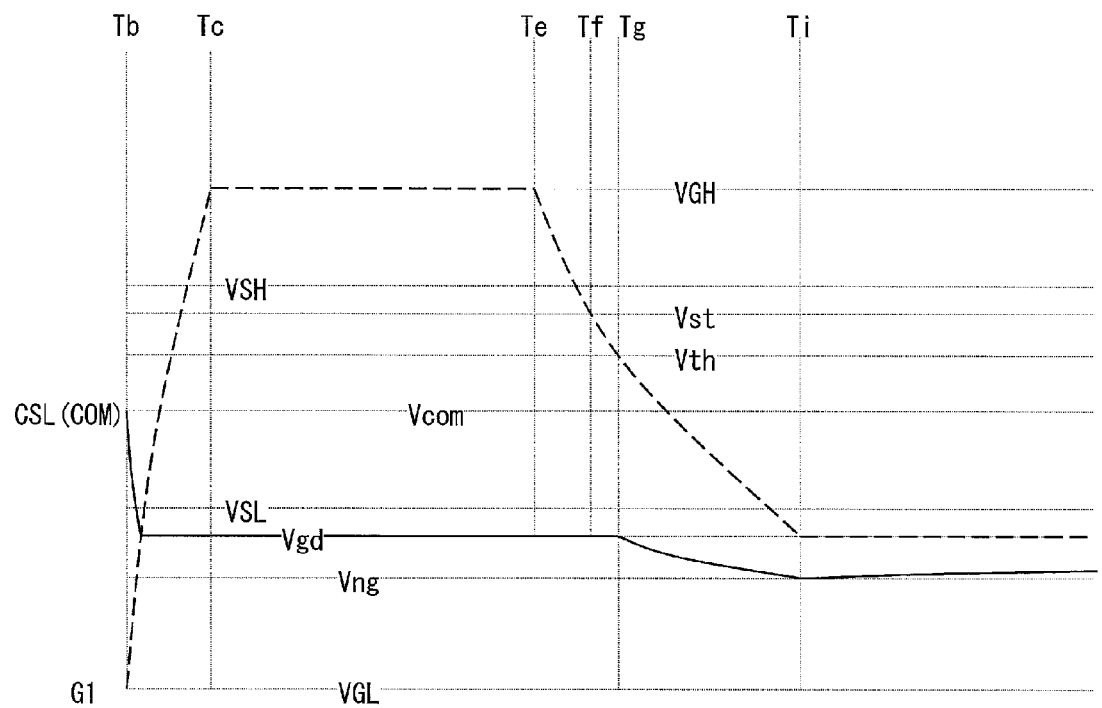
FIG. 20 is a timing chart showing the power-off sequence (including potential variation at a CS line and a common electrode) of Embodiment 4.

The details (sequence after the time Tb) of FIG. 19 are shown in FIG. 20. First, during a period between the time Tb and time Tc (first timing), (i) the transistor TR is turned on by causing an electric potential of the scan signal line G1 to rise up to a gate-on potential VGH and (ii) the ground potential Vgd is supplied to the data signal line SL, the common electrode COM, and the CS line CSL.

At time Te which comes after the Tc, the electric potential of the scan signal line G1 turns downwards. At time Tf at which the electric potential of the scan signal line G1 reaches a specified potential Vst (second electric potential), the common electrode COM and the CS line CSL go in an electrically floating state (high impedance).

At time Tg which follows the time Tf, the electric potential of the scan signal line G1 falls lower than the threshold potential Vth of the transistor. This causes the transistor TR to be turned off. Then, during a period between the time Tg and time Ti, the electric potential of the scan signal line G1 decreases from the threshold potential Vth of the transistor to the ground potential Vgd. During the period between the time Tg and the time Ti, the transistor TR is turned off (an electric resistance between the source electrode of the transistor TR and the pixel electrode PE is extremely high). This, along with the parasitic capacitance Cgd, causes an electric potential of the pixel electrode PE to decrease from the ground potential Vgd to a negative potential Vng (kickback). Meanwhile, since the common electrode COM and the CS line CSL are in an electrically floating state during this period, the electric potentials of the common electrode COM and the CS line CSL also decrease from the ground potential Vgd to the negative potential Vng (see FIG. 20).

Since the common electrode COM and the CS line CSL are in a floating state during a period after the time Ti, the electric potentials of the common electrode COM and the CS line CSL gradually increase toward the ground potential Vgd by an effect of self-discharge (see FIG. 20). The transistor TR is turned off. This, along with the gradual increase in the electric potentials of the common electrode COM and the CS line CSL, causes the electric potential of the pixel electrode PE to gradually increase from the negative potential Vng (see FIG. 20).

According to Embodiment 4, the common electrode COM and the CS line CSL go into an electrically floating state at the time Tf. This brings about such an effect that there is hardly an electric potential difference between the pixel electrode PE and the common electrode COM (i.e. a DC voltage is unlikely to be applied across the pixel Pix) even in a case where potential variation (kickback) occurs at the pixel electrode PE after the time Tg at which the transistor TR is turned off.

Figure 21:
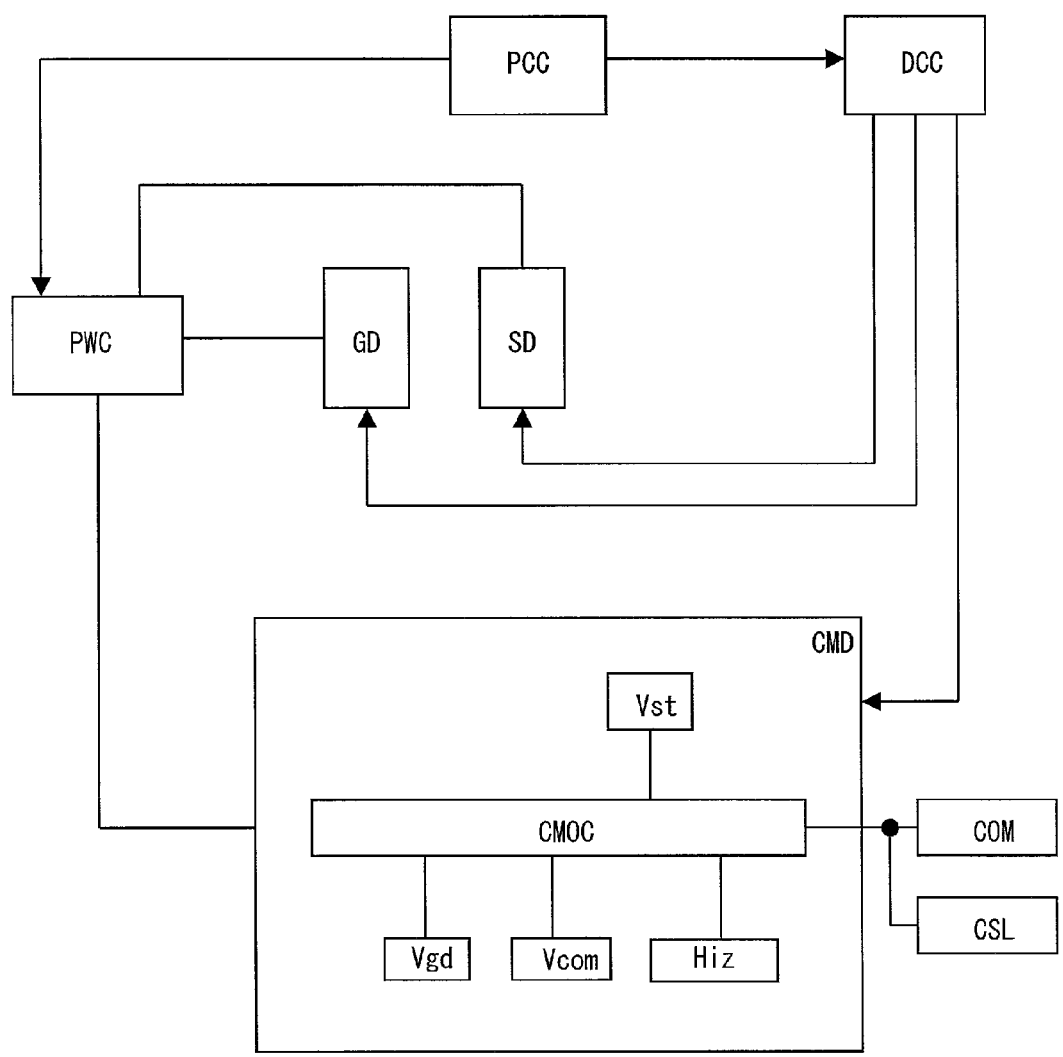
FIG. 21 is a block diagram illustrating the liquid crystal display device of Embodiment 4.

FIG. 21 shows a specific example in which the power-off sequence of FIGS. 19 and 20 is achieved. A configuration shown in FIG. 21 differs from that of FIG. 7 in that an output from the common electrode driver CMD is supplied to the common electrode COM and the CS line CSL which are connected to the common electrode driver CMD.

Embodiment 5

Figure 22:
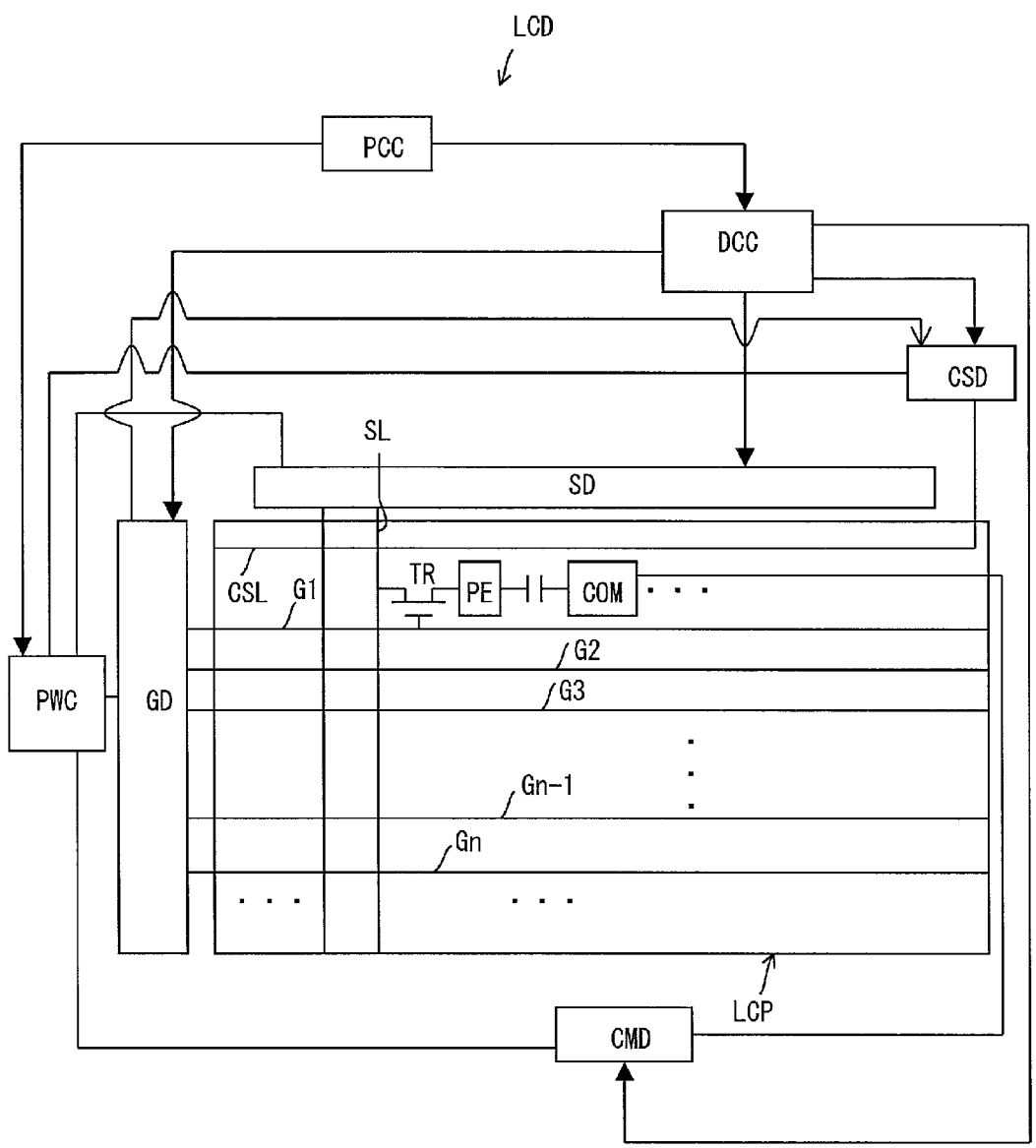
FIG. 22 is a block diagram illustrating a liquid crystal display device of Embodiment 5.
Figure 23:
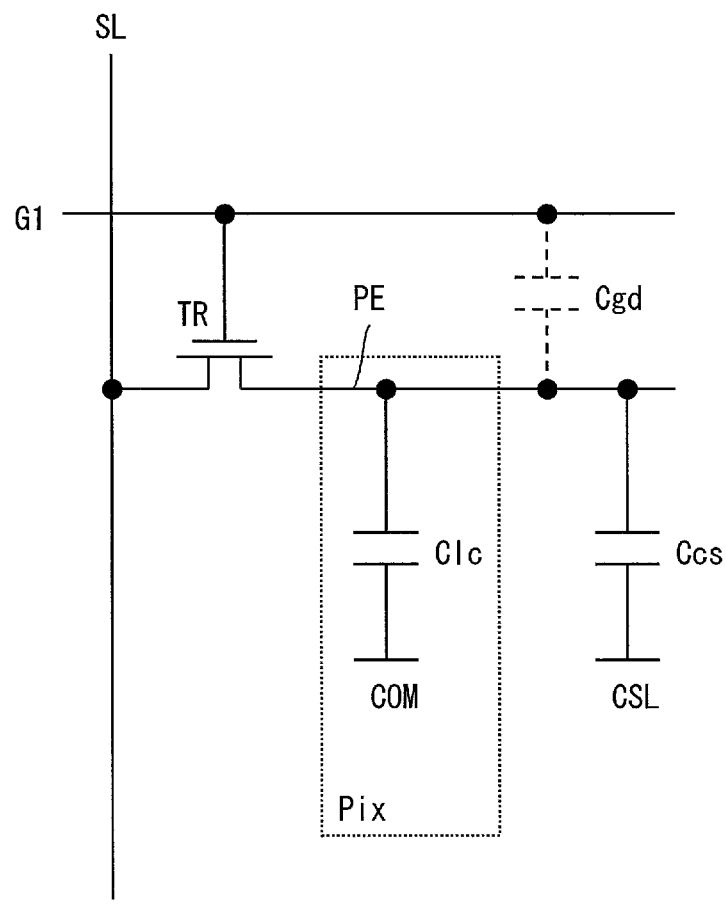
FIG. 23 is an equivalent circuit diagram illustrating part of the liquid crystal display device illustrated in FIG. 22.

A configuration of a liquid crystal display device in accordance with Embodiment 5 is as shown in FIG. 22. The liquid crystal display device LCD of Embodiment 5 is (i) configured to further include, as compared with the liquid crystal display device illustrated in FIG. 2, a CS driver CSD for driving a CS line CSL and (ii) configured such that the CS driver CSD is controlled by a display control circuit DCC. A power supply circuit PWC is controlled by a power supply control circuit PCC to supply various power supply voltages also to the CS driver CSD. According to Embodiment 5, a retention capacitance Ccs is formed by the CS line CSL, a pixel electrode PE, and an insulating layer (for example, a gate insulating film and a channel protection film) sandwiched between the CS line CSL and the pixel electrode PE (see FIG. 23). Note, however, that the CS line CSL and a common electrode COM are driven independently of each other.

Figure 24:
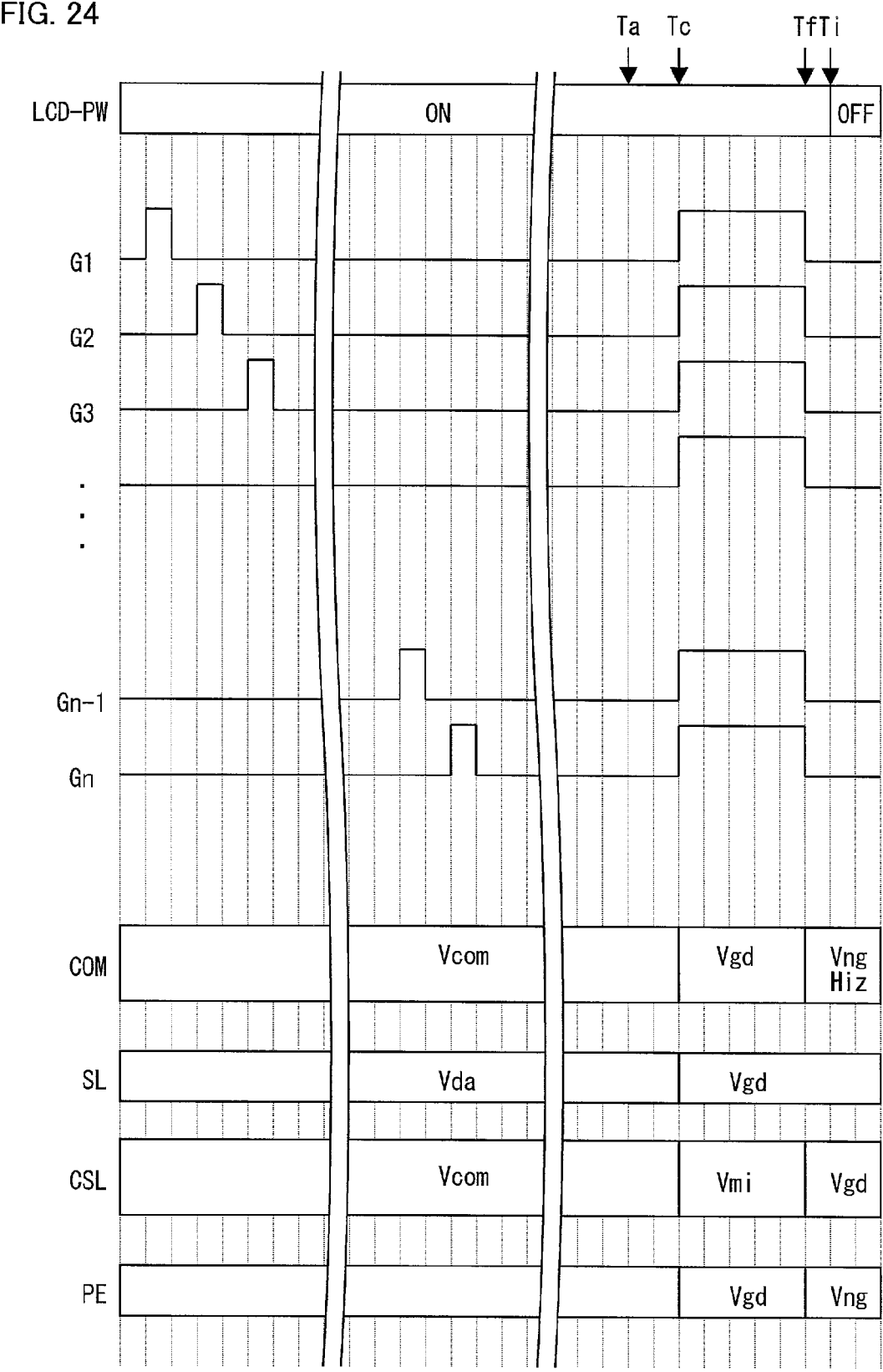
FIG. 24 is a timing chart showing a power-off sequence of Embodiment 5.
Figure 25:
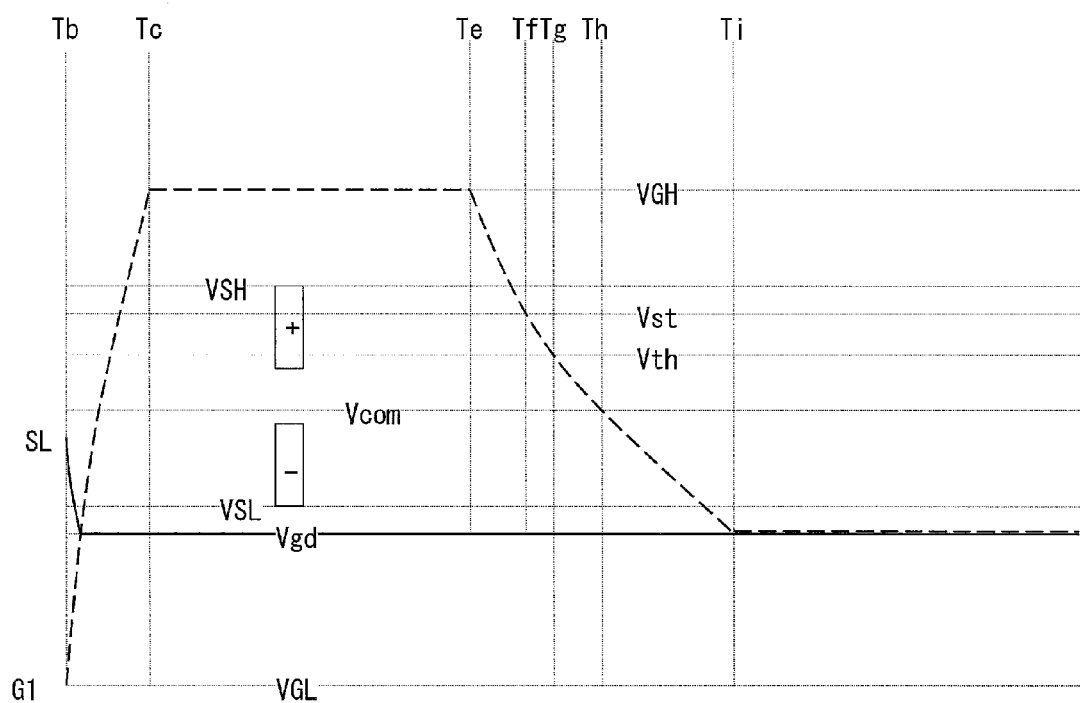
FIG. 25 is a timing chart showing the power-off sequence (including potential variation at a data signal line) of Embodiment 5.
Figure 26:
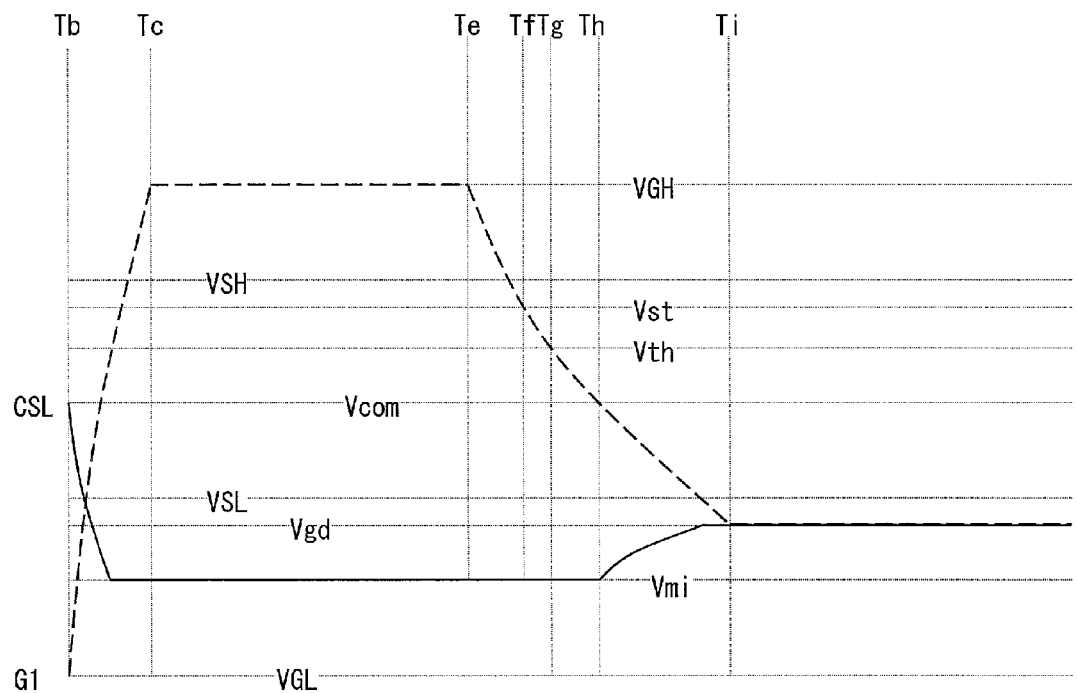
FIG. 26 is a timing chart showing the power-off sequence (including potential variation at a CS line) of Embodiment 5.
Figure 27:
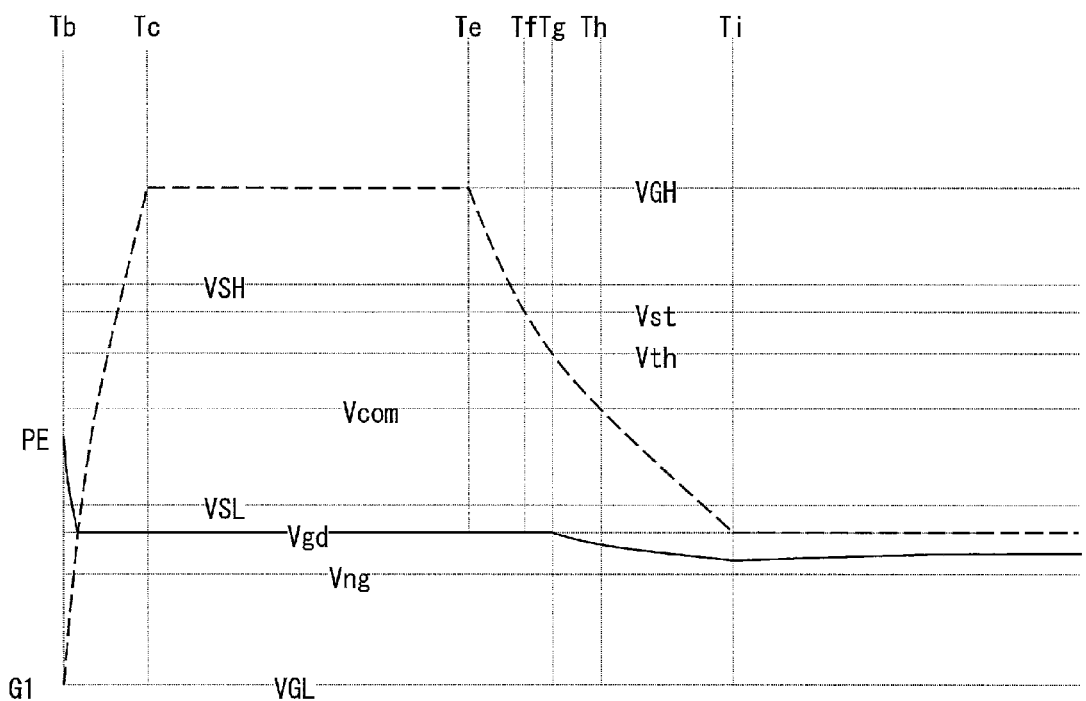
FIG. 27 is a timing chart showing the power-off sequence (including potential variation at a pixel electrode) of Embodiment 5.

The liquid crystal display device of Embodiment 5 is configured such that, in a case where instruction is given at time Ta to turn off a power supply, (i) a transistor TR is turned on by simultaneously scanning scan signal lines G1 through Gn at time Tc (first timing), (ii) a ground potential Vgd is supplied to a data signal line SL and a common electrode COM at the time Tc, (iii) an offset potential Vmi is supplied to the CS line CSL at the time Tc, (iv) the common electrode COM goes into an electrically floating state at time Tf (second timing), and then (v) the ground potential Vgd is supplied to the CS line CSL (see FIG. 24).

The details (sequence after the time Tb) of FIG. 24 are shown in FIGS. 25 through 28. First, during a period between the time Tb and time Tc (first timing), (i) the transistor TR is turned on by causing an electric potential of the scan signal line G1 to rise up to a gate-on potential (VGH) and (ii) the ground potential Vgd is supplied to the data signal line SL and the common electrode COM. Meanwhile, the offset potential Vmi, which is lower than the ground potential Vgd, is supplied to the CS line CSL.

At time Te which comes after the Tc, the electric potential of the scan signal line G1 turns downwards. At time Tf (second electric potential) at which the electric potential of the scan signal line G1 reaches a specified potential Vst, the common electrode COM goes in an electrically floating state (high impedance).

At time Tg which follows the time Tf, the electric potential of the scan signal line G1 falls lower than a threshold potential Vth of the transistor (i.e. the transistor TR is turned off). Then, at time Th (at which, for example, the electric potential of the Scan signal line G1 reaches a potential Vcom), the ground potential Vgd is supplied to the CS line CSL. During a period between the time Tg and time Ti, the electric potential of the scan signal line G1 decreases from the threshold potential Vth of the transistor to the ground potential Vgd.

During the period between the time Tg and the time Ti, the transistor TR is turned off (an electric resistance between the source electrode of the transistor TR and the pixel electrode PE is extremely high). This, along with the parasitic capacitance Cgd, causes an electric potential of the pixel electrode PE to decrease from the ground potential Vgd. However, by the effect of an increase in electric potential of the CS line CSL during this period (cancelling effect), the electric potential of the pixel electrode PE does not decrease so much as to reach a negative potential Vng shown in FIG. 5 (see FIG. 27). Meanwhile, since the common electrode COM is in an electrically floating state during this period, the electric potential of the common electrode COM also decreases from the ground potential Vgd, but not so much as to reach the negative potential Vng (see FIG. 28).

Figure 28:
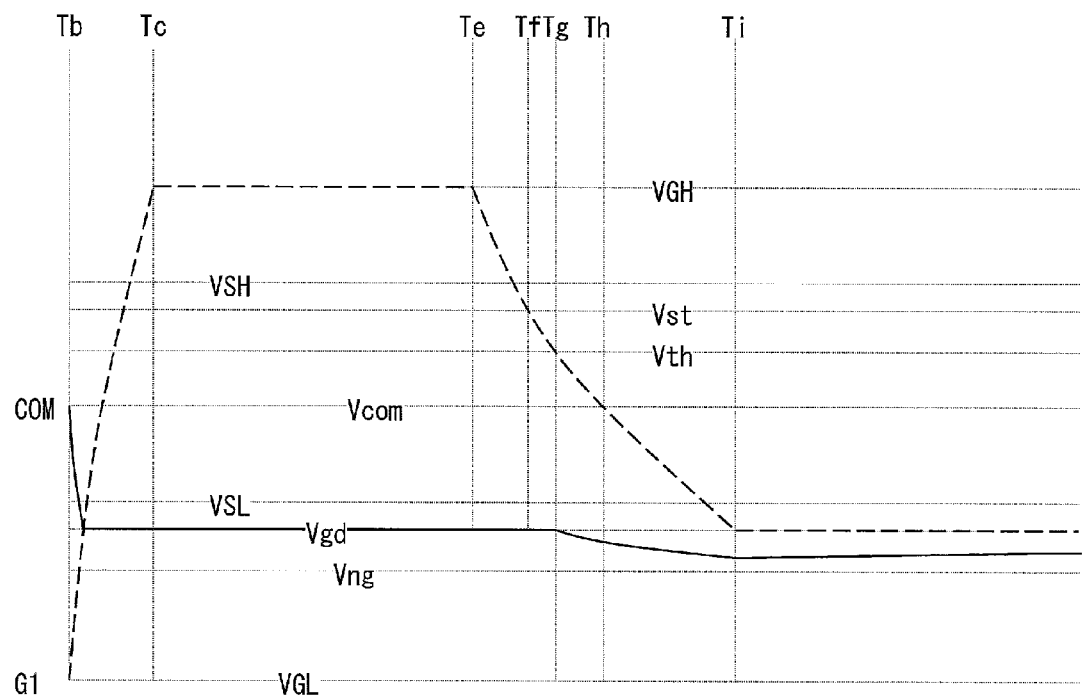
FIG. 28 is a timing chart showing the power-off sequence (including potential variation at a common electrode) of Embodiment 5.

Since the common electrode COM is in a floating state during a period after the time Ti, the electric potential of the common electrode COM gradually increases toward the ground potential Vgd by an effect of self-discharge (see FIG. 28). The transistor TR is turned off. This, along with the gradual increase in the electric potential of the common electrode COM, causes the electric potential of the pixel electrode PE to gradually increase (see FIGS. 27 and 28).

According to Embodiment 5, the common electrode COM goes into an electrically floating state at the time Tf. This brings about such an effect that there is hardly an electric potential difference between the pixel electrode PE and the common electrode COM (i.e. a DC voltage is unlikely to be applied across the pixel Pix) even in a case where potential variation (kickback) occurs at the pixel electrode PE after the time Tg at which the transistor TR is turned off. In addition, because of the cancelling effect obtained by upthrusting the electric potential of the CS line CSL after the time Th, the kickback itself can be made small.

Figure 29:
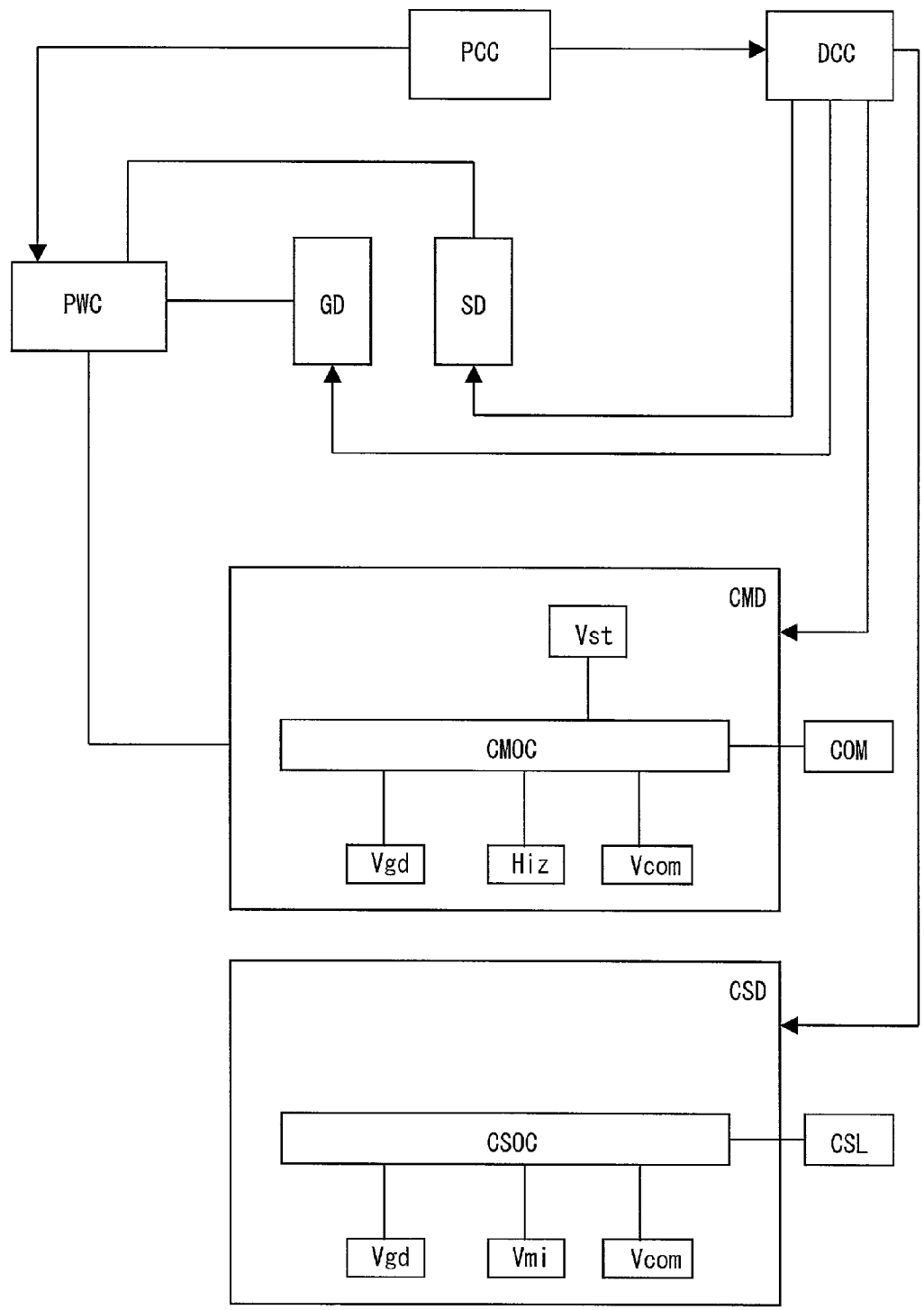
FIG. 29 is a block diagram illustrating the liquid crystal display device of Embodiment 5.

FIG. 29 shows a specific example in which the power-off sequence of Embodiment 5 is achieved. As illustrated in FIG. 29, the CS driver CSD includes a CS electric potential output circuit CSOC. In response to instruction from the display control circuit DCC, the CS electric potential output circuit CSOC causes an output electric potential supplied to the CS line CSL to be switched from the display center potential Vcom to the offset potential Vmi at time Tb. The power supply control circuit PCC monitors a power source potential which is supplied from the power supply circuit PWC to the gate driver GD. When the power source potential reaches the potential Vcom, for example, the power supply control circuit PCC provides the display control circuit DCC with notification (that the power source potential from the power supply circuit PWC has reached the potential Vcom). In response to the notification, the display control circuit DCC provides the CS electric potential output circuit CSOC with instruction which causes the CS electric potential output circuit CSOC to switch the output electric potential (supplied to CS line CSL) from the offset potential Vmi to the ground potential Vgd. Note that the function of a common electrode driver CMD is similar to that of the common electrode driver CMD shown in FIG. 7.

Embodiment 6

Figure 30:
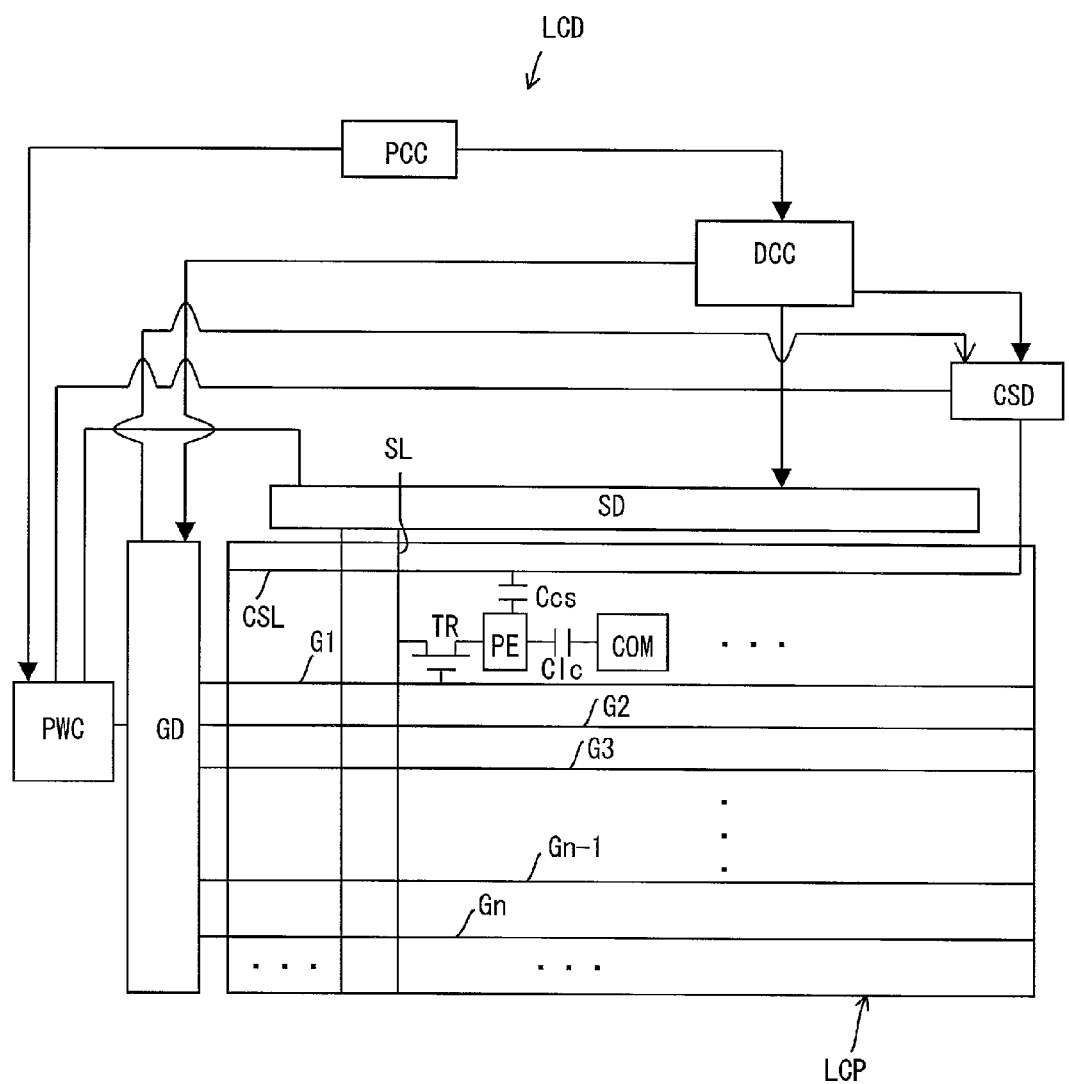
FIG. 30 is a block diagram illustrating a liquid crystal display device of Embodiment 6.

FIG. 30 is a block diagram illustrating a configuration of a liquid crystal display device of Embodiment 6. As illustrated in FIG. 30, the liquid crystal display device LCD of Embodiment 6 includes (i) a liquid crystal panel LCP including two substrates (not illustrated) and a liquid crystal layer (not illustrated) sandwiched between the two substrates, (ii) a display control circuit DCC, (iii) a source driver SD, (iv) a gate driver GD, (v) a CS driver CSD, (vi) a power supply circuit PWC, and (vii) a power supply control circuit PCC.

The liquid crystal panel LCP includes scan signal lines G1 through Gn, a data signal line SL, a pixel electrode PE, a transistor (thin film transistor, TFT) TR, and a common electrode COM. The transistor TR has (i) a gate electrode which is connected to the scan signal line G1, (ii) a source electrode which is connected to a the data signal line SL, and (iii) a drain electrode which is connected to the pixel electrode PE. A pixel capacitance (liquid crystal capacitance) Clc is formed by the pixel electrode PE, the common electrode COM, and the liquid crystal layer. A retention capacitance Ccs is formed by the CS line (retention capacitor wiring) CSL, the pixel electrode PE, and an insulating layer (for example, a gate insulating film and a channel protection film) sandwiched between the CS line CSL and the pixel electrode PE. Note that a parasitic capacitance is formed between the gate electrode (scan signal line G1) of the transistor TR and the drain electrode (pixel electrode PE) of the transistor TR.

The source driver SD drives the data signal line SL. The gate driver GD drives the scan signal lines G1 through Gn. The CS driver CSD drives the CS line CSL (the CS line CSL is driven independently of the common electrode COM). The display control circuit DCC (i) includes a timing controller and an image processing circuit and (ii) controls the source driver SD, the gate driver GD, and the CS driver CSD. The power supply control circuit PCC controls the power supply circuit PWC in response to instruction from a user or a system. The power supply circuit PWC is controlled by the power supply control circuit PCC to supply various power supply voltages to the source driver SD, the gate driver GD, and the CS driver CSD.

Figure 31:
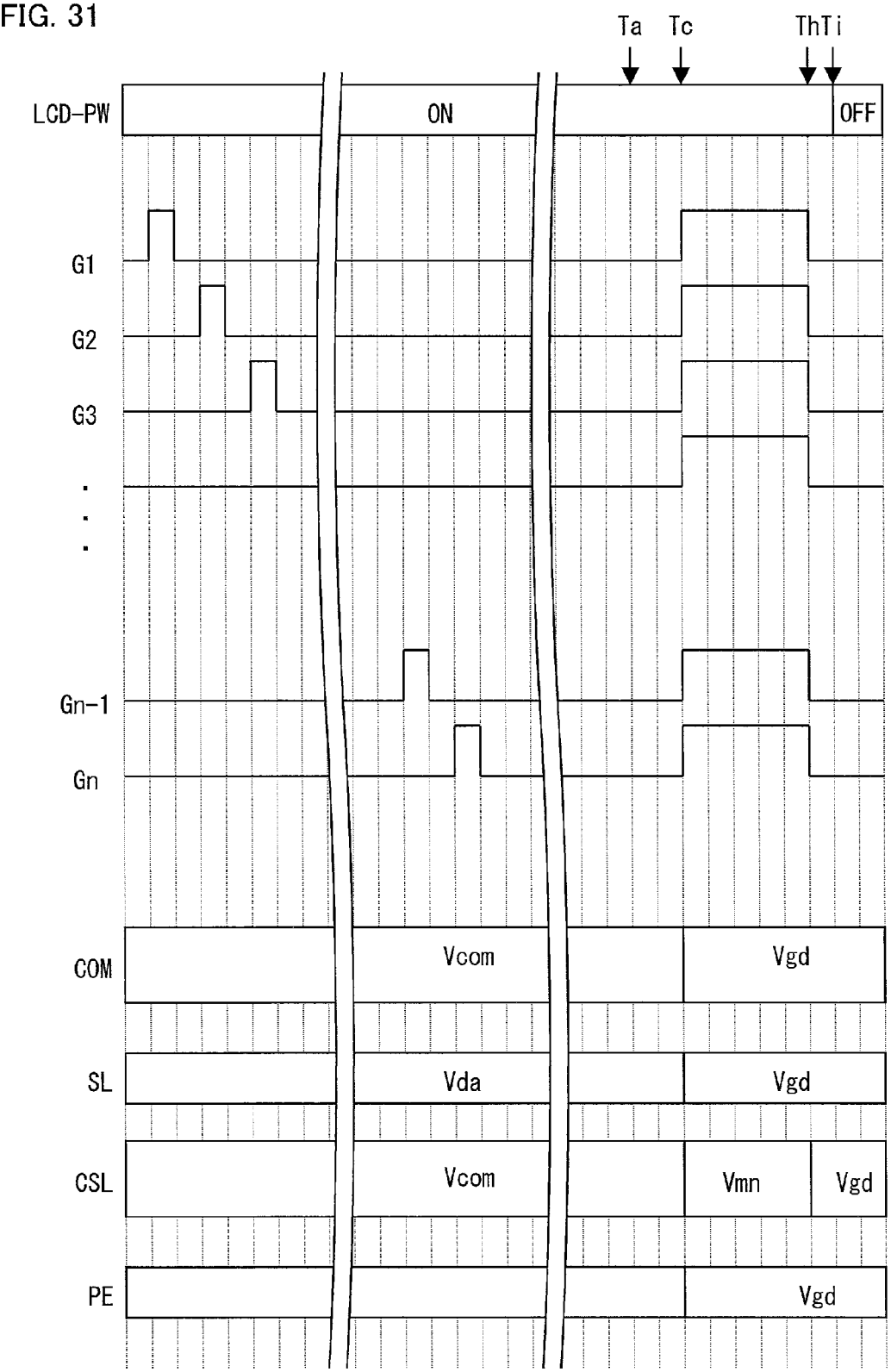
FIG. 31 is a timing chart showing a power-off sequence of Embodiment 6.
Figure 32:
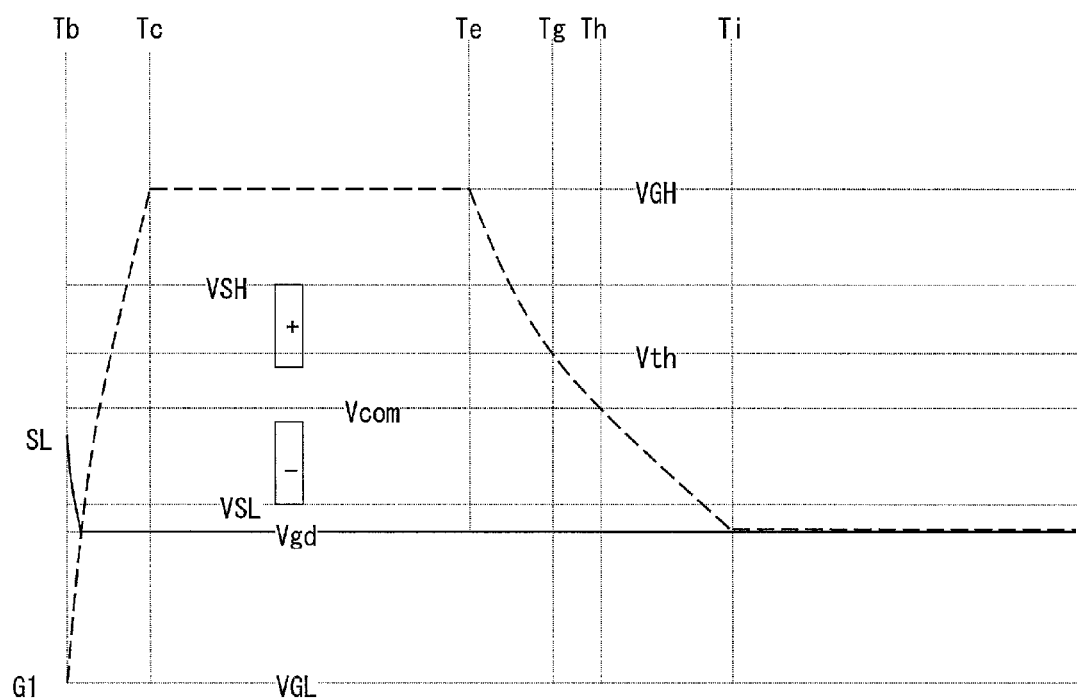
FIG. 32 is a timing chart showing the power-off sequence (including potential variation at a data signal line) of Embodiment 6.
Figure 33:
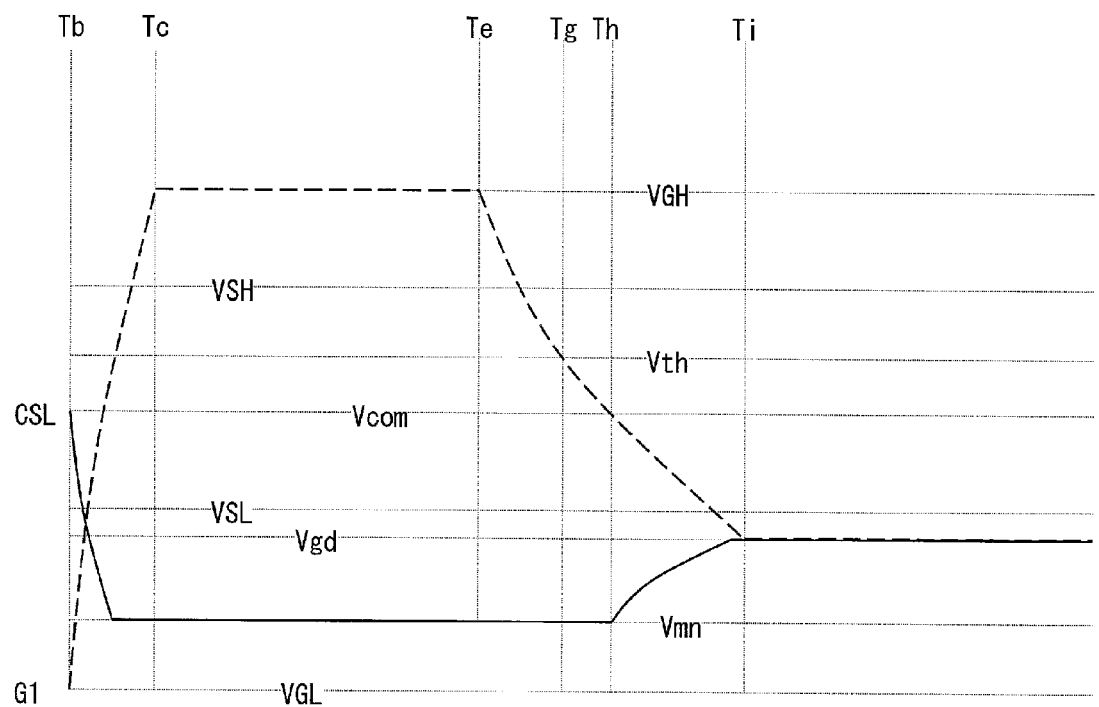
FIG. 33 is a timing chart showing the power-off sequence (including potential variation at a CS line) of Embodiment 6.
Figure 34:
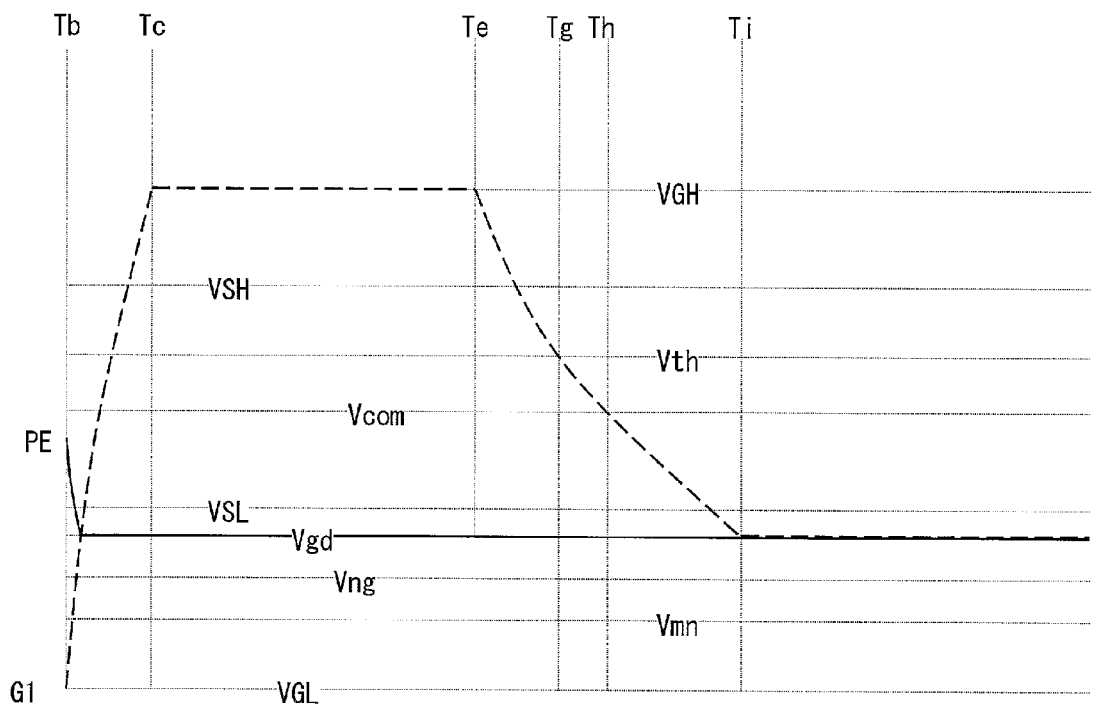
FIG. 34 is a timing chart showing the power-off sequence (including potential variation at a pixel electrode) of Embodiment 6.
Figure 35:
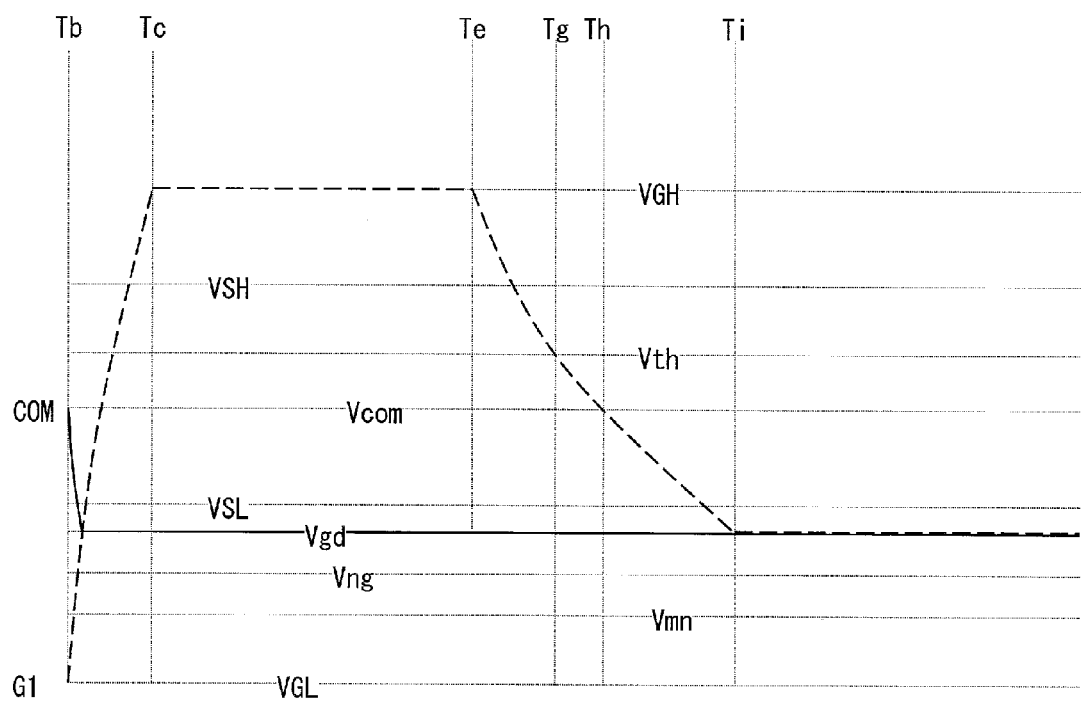
FIG. 35 is a timing chart showing the power-off sequence (including potential variation at a common electrode) of Embodiment 6.

The liquid crystal display device of Embodiment 6 is configured such that, in a case where instruction is given at time Ta to turn off a power supply, (i) a transistor TR is turned on by simultaneously scanning scan signal lines G1 through Gn at time Tc (first timing), (ii) a ground potential Vgd is supplied to a data signal line SL and a common electrode COM at the time Tc, (iii) an offset potential Vmn is supplied to the CS line CSL at the time Tc, and (iv) the ground potential Vgd is supplied to the CS line CSL at time Th (see FIG. 31).

The details (sequence after the time Tb) of FIG. 31 are shown in FIGS. 32 through 35. First, during a period between the time Tb and time Tc, (i) the transistor TR is turned on by causing an electric potential of the scan signal line G1 to rise up to a gate-on potential (VGH) and (ii) the ground potential Vgd is supplied to the data signal line SL and the common electrode COM. Meanwhile, the offset potential Vmn, which is lower than the ground potential Vgd, is supplied to the CS line CSL. Then, the electric potential of the scan signal line G1 turns downwards at time Te.

At time Tg which follows the time Tf, the electric potential of the scan signal line G1 falls lower than a threshold potential Vth of the transistor (i.e. the transistor TR is turned off). Then, at time Th (at which, for example, the electric potential of the Scan signal line G1 reaches a potential Vcom), the ground potential Vgd is supplied to the CS line CSL. During a period between the time Tg and time Ti, the electric potential of the scan signal line G1 decreases from the threshold potential Vth of the transistor to the ground potential Vgd.

During the period between the time Tg and the time Ti, the transistor TR is turned off (an electric resistance between the source electrode of the transistor TR and the pixel electrode PE is extremely high). This, along with the parasitic capacitance Cgd, causes the pixel electrode to be influenced by a decrease in the electric potential of the scan signal line G1. However, since the influence of the downward thrust in the scan signal line G1 is offset by an influence of an increase in the electric potential of the CS line CSL during the period (see FIG. 33), the electric potential of the pixel electrode PE hardly changes (see FIG. 34).

According to Embodiment 6, the electric potential of the CS line CSL is increased after the transistor TR is turned off. This makes it possible to substantially offset the potential variation (kickback) of the pixel electrode PE, which potential variation is caused by the transistor TR turning off (i.e. the increase in the electric potential of the scan signal line G1). Note that the offset potential Vmn only needs to be set in accordance with capacitance around a pixel (including pixel capacitance Clc, retention capacitance Ccs, and other parasitic capacitances), a potential difference between the threshold potential Vth and the ground potential Vgd, and the like, such that the kickback will be substantially offset.

FIGS. 40 through 42 are views showing reference examples in which the electric potential of the CS line CSL is not controlled. These examples indicate that, after time Tg at which the transistor TR is turned off, potential variation (kickback) at the pixel electrode PE causes a DC voltage to be applied across the pixel electrode PE and the common electrode COM (i.e. pixel Pix) even after the power supply is turned off (until self-discharge via the transistor TR ends). In particular, in a case where an oxide semiconductor (e.g. oxide semiconductor (InGaZnOx) containing indium, gallium, and zinc) is used for a semiconductor layer of the transistor TR, on-state/off-state characteristics are so excellent as to prevent self-discharge from easily occurring (described later). This causes the DC voltage to be applied across the pixel Pix for an extended period of time. In other words, in a case where an oxide semiconductor is used for the semiconductor layer of the transistor TR, the effect of Embodiment 6 becomes significant.

Figure 36:
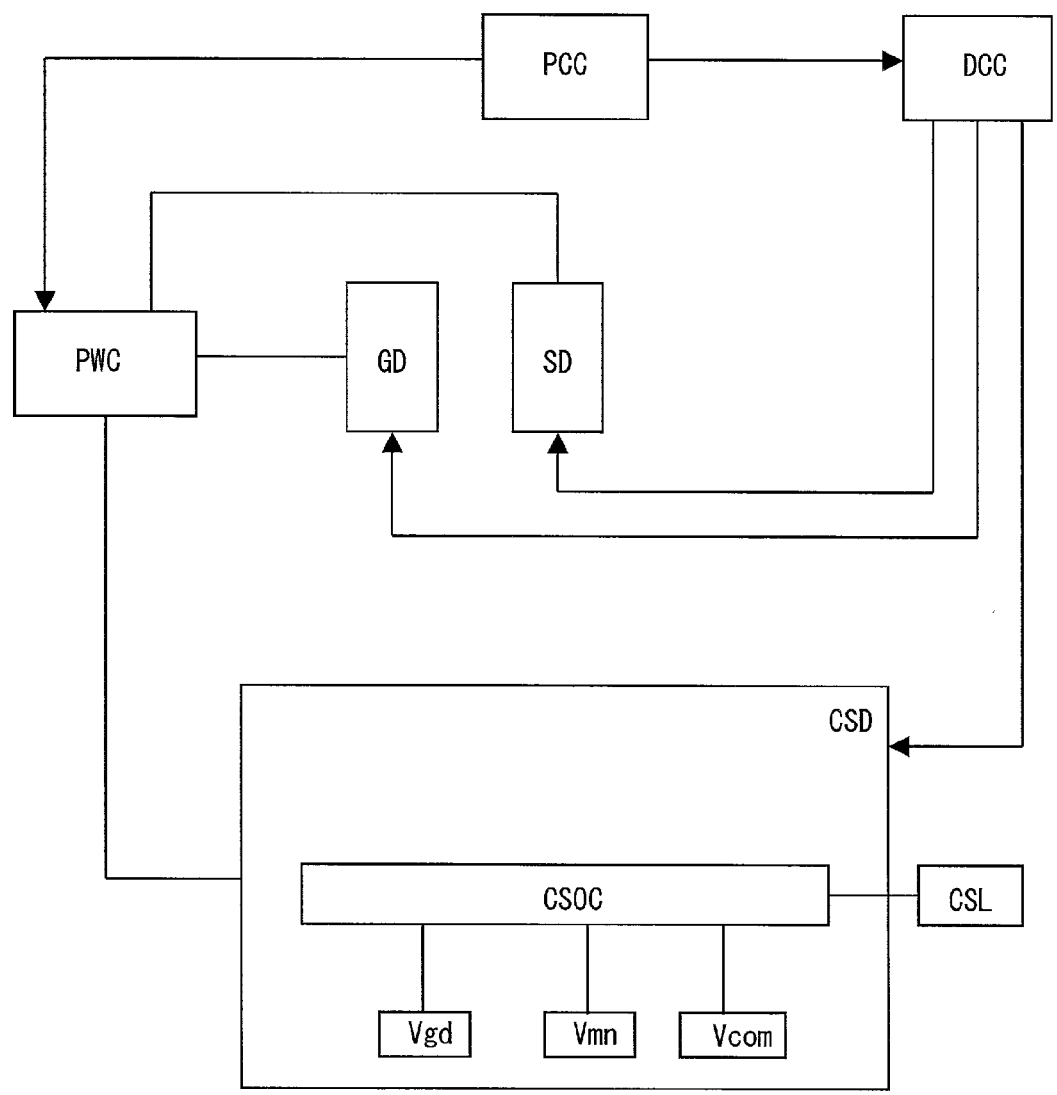
FIG. 36 is a block diagram illustrating the liquid crystal display device of Embodiment 6.

FIG. 36 shows a specific example in which the power-off sequence of Embodiment 6 is achieved. As illustrated in FIG. 36, the CS driver CSD includes a CS electric potential output circuit CSOC. In response to instruction from the display control circuit DCC, the CS electric potential output circuit CSOC causes an output electric potential supplied to the CS line CSL to be switched from the display center potential Vcom to the offset potential Vmn at time Tb. The power supply control circuit PCC monitors a power source potential which is supplied from the power supply circuit PWC to the gate driver GD. When the power source potential reaches the potential Vcom, the power supply control circuit PCC provides the display control circuit DCC with notification (that the power source potential from the power supply circuit PWC has reached the potential Vcom). In response to the notification, the display control circuit DCC provides the CS electric potential output circuit CSOC with instruction which causes the CS electric potential output circuit CSOC to switch the output electric potential (supplied to CS line CSL) from the offset potential Vmn to the ground potential Vgd.

Figure 37:
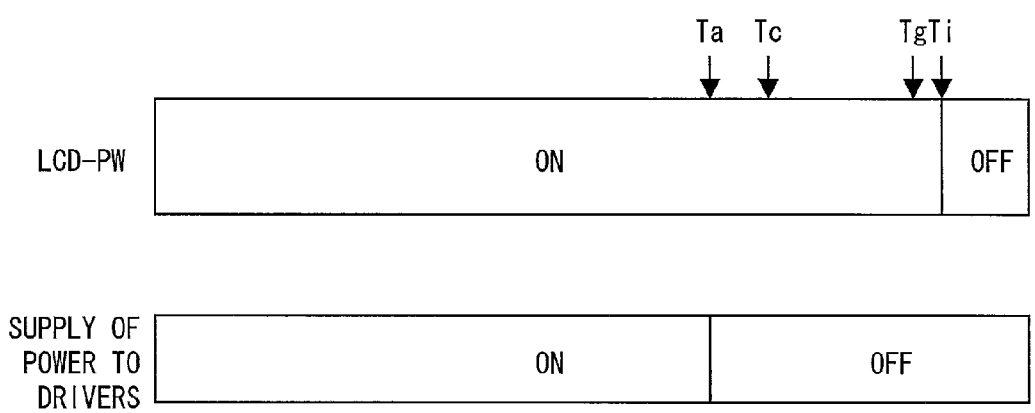
FIG. 37 is a timing chart illustrating how power is supplied to drivers in Embodiment 6.

According to the Embodiment 6, as illustrated in FIG. 37, the power supply circuit PWC stops, at the time Ta, supplying power to the drivers D (GD, SD, and CSD). Then, a sequence from the time Ta through time Ti is carried out, depending on residual voltages of the drivers D (GD, SD, and CSD). Note, however, that the power supply circuit PWC can supply power to the drivers until the time Ti.

Figure 38:
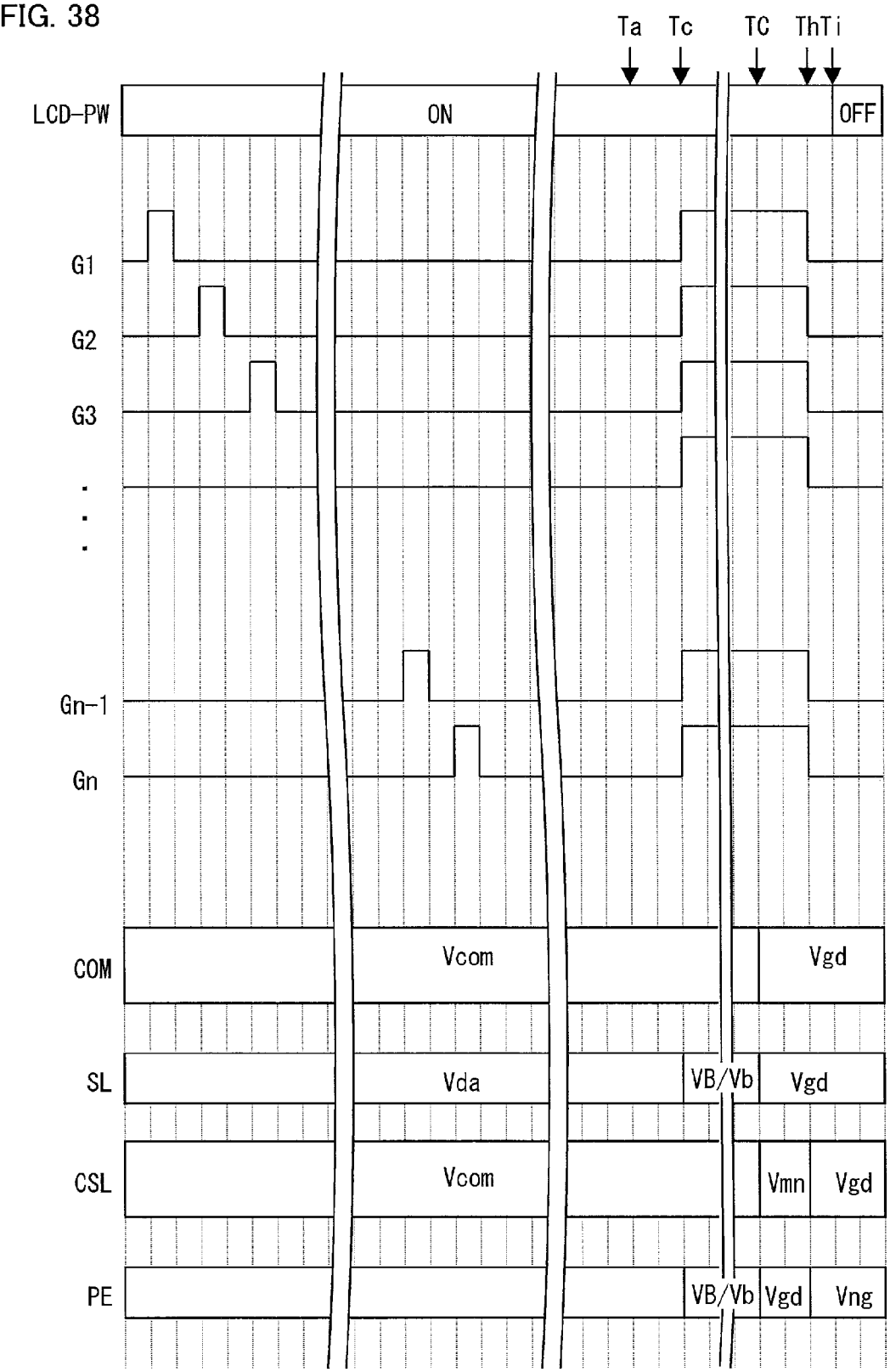
FIG. 38 is a timing chart showing a modification of the power-off sequence illustrated in FIG. 30.

According to Embodiment 6, as illustrated in FIG. 38, a period between the time Tc (at which the electric potential of the scan signal line G1 rises) and time TC (after the time Tc and before the time Th) can be set as a black-display period. During the black-display period, black-display potentials (potential VB having a positive value/potential Vb having a negative value) is supplied to the data signal line SL. At the time TC, (i) the ground potential Vgd is supplied to the data signal line SL and to the common electrode COM and (ii) the offset potential Vmn is supplied to the CS line CSL.

The liquid crystal display device illustrated in FIGS. 30 through 38 can be described as a liquid crystal display device including: a data signal line; a scan signal line; a pixel electrode; a transistor connected to the data signal line, the scan signal line, and the pixel electrode; and a capacitor wire (for example, a CS line) for causing a capacitance to be formed between the pixel electrode and the capacitor wire, the liquid crystal display device being configured to turn on the transistor during a power-off sequence by causing a change in an electric potential of the scan signal line, the electric potential of the scan signal line reaching a first electric potential at a first timing after the change is initiated, direction of the change shifting to a first direction after the first timing so that the electric potential of the scan signal line reaches a second electric potential at a second timing, and an electric potential of the capacitor wire changing in a second direction opposite the first direction at the second timing.

The liquid crystal display device can be configured such that (i) the transistor is of an N-channel type and (ii) the second electric potential is lower than the first electric potential. The liquid crystal display device can be configured such that the second electric potential is higher than a ground potential. The liquid crystal display device can be configured such that the second electric potential is higher than an electric potential of the common electrode during normal display. The liquid crystal display device can be configured such that the second electric potential is lower than a threshold potential of the transistor. The liquid crystal display device can be configured such that the electric potential of the capacitor wire changes, at the second timing, to the ground potential from an electric potential which is lower than the ground potential.

Remarks on Embodiments

Figure 39:
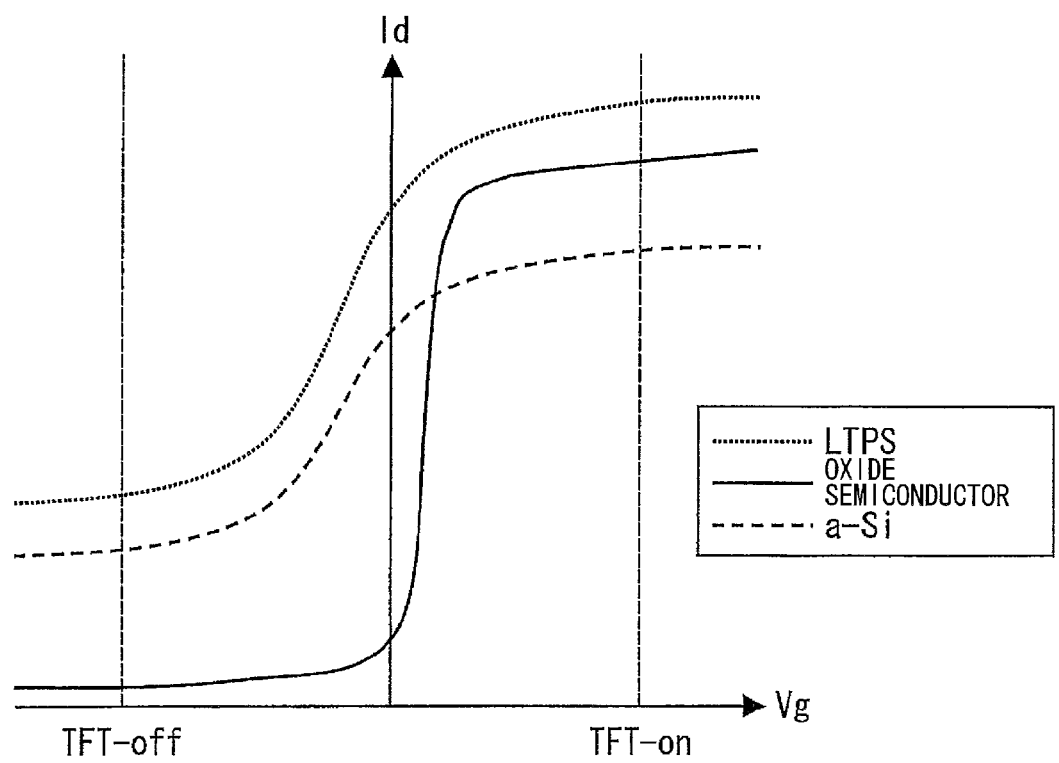
FIG. 39 is a graph showing characteristics of oxide semiconductors.

According to each of the liquid crystal display devices of the above embodiments, it is desirable that a TFT, in which a semiconductor layer is formed by what is known as an oxide semiconductor, be used as a transistor of a liquid crystal panel. Examples of the oxide semiconductor encompass an oxide semiconductor (InGaZnOx) containing indium, gallium, and zinc. FIG. 39 shows respective characteristics of (i)

a TFT employing an oxide semiconductor, (ii) a TFT employing a-Si (amorphous silicon), and (iii) a TFT employing LTPS (Low Temperature Poly Silicon). In FIG. 39, a horizontal axis (Vg) indicates a voltage supplied to the TFTs, and a vertical axis (Id) indicates a value of an electric current through respective source-to-drain connections of the TFTs (In FIG. 39, a period shown as "TFT-on" indicates a period in which the TFTs are turned on whereas a period shown as "TFT-off" indicates a period in which the TFTs are turned off). As illustrated in FIG. 39, an on-state current/off-state current ratio of the oxide semiconductor TFT is 1,000 times or more higher than that of a-Si TFT. This indicates that the oxide semiconductor TFT has quite excellent on-state/off-state characteristics.

Specifically, a leak current while the oxide semiconductor TFT is turned off is approximately 1/100 of a leak current while the a-Si TFT is turned off. That is, an off-state characteristic of the oxide semiconductor TFT is so excellent as to hardly allow a leak current. Note, however, that the quite excellent off-state characteristic leaves a high possibility of electric charge remaining in a pixel for an extended period of time while the TFT is turned off.

According to each of the liquid crystal display devices of the above embodiments, the power supply circuit PWC stops supplying power to the drivers D (GD, SD, and CSD). This causes a power source potential GPW, for example, to be maintained until the time Te but then decrease by self-discharge (see FIG. 40). Note that in a case where the power source potential GPW has already decreased at the time Tb, the power source potential GPW changes as illustrated in FIG. 41. In a case of FIG. 41, the transistor TR is turned on by causing the scan signal line G1 to rise, during a period between the time Tb and time Tc (first timing), to an electric potential (first electric potential; electric potential lower than the gate-on potential VGH) which is higher than the threshold potential Vth of the transistor.

The liquid crystal display device of the present invention includes: a data signal line; a scan signal line; a pixel electrode; a transistor connected to (i) the data signal line, (ii) the scan signal line, and (iii) the pixel electrode; and a common electrode, the liquid crystal display device being configured to turn on the transistor during a power-off sequence by causing a change in an electric potential of the scan signal line, the electric potential of the scan signal line reaching a first electric potential at a first timing after the change is initiated, and the common electrode being in an electrically floating state at a second timing which comes after the first timing.

With the configuration, it is possible to cause the pixel electrode to discharge electric charge by turning on the transistor after the first timing of the power-off sequence. In addition, since the common electrode goes into an electrically floating state at the second timing, the electric potential of the common electrode changes in accordance with the change in the electric potential of the pixel electrode even if kickback occurs in reaction to a change in status of the transistor from an on state to an off state.

The liquid crystal display device can be configured such that: the transistor is of an n-channel type; and the electric potential of the scan signal line, after reaching the first electric potential at the first timing, reaches a second electric potential at the second timing.

The liquid crystal display device can be configured such that the second electric potential is higher than a ground potential.

The liquid crystal display device can be configured such that the second electric potential is higher than an electric potential of the common electrode during normal display.

The liquid crystal display device can be configured such that the second electric potential is higher than a threshold potential of the transistor.

The liquid crystal display device can be configured to further include a common electrode driver for driving the common electrode, the common electrode driver including an output circuit for switching, at the second timing, an electrical status of the common electrode from a non-floating state to a floating state.

The liquid crystal display device can be configured to further include: a source driver for driving the data signal line; and a power supply circuit, the second electric potential being equal to one of a plurality of electric potentials supplied from the power supply circuit to the source driver.

The liquid crystal display device can be configured such that an electric potential of the common electrode immediately before the second timing is a third electric potential.

The liquid crystal display device can be configured such that the third electric potential is supplied to the data signal line immediately before the second timing.

The liquid crystal display device can be configured such that, after the first timing, an electric potential of the common electrode is set to a fourth electric potential and then set to the third electric potential (for example, the ground potential).

The liquid crystal display device can be configured such that, after the first timing, a fifth electric potential is supplied to the data signal line and then the third electric potential (for example, the ground potential) is supplied to the data signal line.

The liquid crystal display device can be configured such that a pixel including the pixel electrode carries out black display by (i) setting the electric potential of the common electrode to the fourth electric potential and (ii) causing the data signal line to write the fifth electric potential into the pixel electrode.

The liquid crystal display device can be configured to further include a capacitor wire for causing a capacitance to be formed between the pixel electrode and the capacitor wire, the capacitor wire being in an electrically floating state at the second timing.

The liquid crystal display device can be configured such that an oxide semiconductor is used for a semiconductor layer of the transistor.

The liquid crystal display device can be configured such that the oxide semiconductor contains indium, gallium, and zinc.

A method of the present invention is a method for driving a liquid crystal display device, said liquid crystal display device including: a data signal line; a scan signal line; a pixel electrode; a transistor connected to (i) the data signal line, (ii) the scan signal line, and (iii) the pixel electrode; and a common electrode, the liquid crystal display device being configured to turn on the transistor during a power-off sequence by causing a change in an electric potential of the scan signal line, said method including the steps of: causing the electric potential of the scan signal line to reach a first electric potential at a first timing after the change is initiated; and causing the common electrode to be in an electrically floating state at a second timing which comes after the first timing.

The present invention is not limited to the description of the embodiments, but can be altered in many ways by a person skilled in the art within the scope of the claims. An embodiment derived from a proper combination of technical means disclosed in different embodiments is also encompassed in the technical scope of the present invention.

INDUSTRIAL APPLICABILITY

A liquid crystal display device of the present invention is suitable for, for example, various liquid crystal displays and various liquid crystal televisions.

REFERENCE SIGNS LIST

LCD Liquid crystal display device
TR Transistor
COM Common electrode
SL Data signal line
CSL CS line (storage capacitor wire)
G1 through Gn Scan signal line
SD Source driver
GD Gate driver
AM Active matrix substrate
LCP Liquid crystal panel
PE Pixel electrode
DCC Display control circuit
PWC Power supply circuit
PCC Power supply control circuit

The invention claimed is:

1. A liquid crystal display device comprising:
a data signal line;
a scan signal line;
a pixel electrode;
a transistor connected to (i) the data signal line, (ii) the scan signal line, and (iii) the pixel electrode; and
a common electrode, wherein
the transistor is an n-channel transistor,
the liquid crystal display device turns on the transistor during a power-off sequence by causing a change in an electric potential of the scan signal line,
the electric potential of the scan signal line reaches a first electric potential at a first timing after the change is initiated,
after reaching the first electric potential at the first timing, the electric potential of the scan signal line decreases and reaches a second electric potential at a second timing that occurs after the first timing,
the common electrode is in an electrically floating state at the second timing, and
the second electric potential is higher than a threshold potential of the transistor.

2. A liquid crystal display device as set forth in claim 1, further comprising:
a common electrode driver for driving the common electrode,
the common electrode driver including an output circuit for switching, at the second timing, an electrical status of the common electrode from a non-floating state to a floating state.

3. A liquid crystal display device as set forth in claim 1, further comprising: a source driver for driving the data signal line; and a power supply circuit, the second electric potential being equal to one of a plurality of electric potentials supplied from the power supply circuit to the source driver.

4. The liquid crystal display device as set forth in claim 1, wherein an electric potential of the common electrode immediately before the second timing is a third electric potential.

5. The liquid crystal display device as set forth in claim 4, wherein the third electric potential is supplied to the data signal line immediately before the second timing.

6. The liquid crystal display device as set forth in claim 5, wherein, after the first timing, an electric potential of the common electrode is set to a fourth electric potential and then set to the third electric potential.

7. The liquid crystal display device as set forth in claim 6, wherein, after the first timing, a fifth electric potential is supplied to the data signal line and then the third electric potential is supplied to the data signal line.

8. The liquid crystal display device as set forth in claim 7, wherein a pixel including the pixel electrode carries out black display by (i) setting the electric potential of the common electrode to the fourth electric potential and (ii) causing the data signal line to write the fifth electric potential into the pixel electrode.

9. A liquid crystal display device as set forth in claim 1, further comprising:
a capacitor wire for causing a capacitance to be formed between the pixel electrode and the capacitor wire,
the capacitor wire being in an electrically floating state at the second timing.

10. The liquid crystal display device as set forth in claim 1, wherein an oxide semiconductor is used for a semiconductor layer of the transistor.

11. The liquid crystal display device as set forth in claim 10, wherein the oxide semiconductor contains indium, gallium, and zinc.

12. A method of driving a liquid crystal display device, the liquid crystal display device comprising:
a data signal line;
a scan signal line;
a pixel electrode;
a transistor connected to (i) the data signal line, (ii) the scan signal line, and (iii) the pixel electrode; and
a common electrode, wherein
the transistor is an n-channel transistor,
the liquid crystal display device turns on the transistor during a power-off sequence by causing a change in an electric potential of the scan signal line,
the method comprising the steps of:
causing the electric potential of the scan signal line to reach a first electric potential at a first timing after the change is initiated;
after reaching the first electric potential at the first timing, causing the electric potential of the scan signal line to decrease and reach a second electric potential at a second timing that occurs after the first timing,
causing the common electrode to be in an electrically floating state at the second timing, and
causing the second electric potential to be higher than a threshold potential of the transistor.

* * * * *